(12) United States Patent
Scholl et al.

(10) Patent No.: US 11,386,461 B2
(45) Date of Patent: *Jul. 12, 2022

(54) DEAL GENERATION USING POINT-OF-SALE SYSTEMS AND RELATED METHODS

(71) Applicant: Groupon, Inc., Chicago, IL (US)

(72) Inventors: Nathaniel B. Scholl, Oakland, CA (US); Yishai Lerner, San Francisco, CA (US); Francisco Larrain, Palo Alto, CA (US); Joshua Puckett, Palo Alto, CA (US)

(73) Assignee: Groupon, Inc., Chicago, IL (US)

( * ) Notice: Subject to any disclaimer, the term of this patent is extended or adjusted under 35 U.S.C. 154(b) by 125 days.

This patent is subject to a terminal disclaimer.

(21) Appl. No.: 16/380,526

(22) Filed: Apr. 10, 2019

(65) Prior Publication Data

US 2019/0370864 A1    Dec. 5, 2019

Related U.S. Application Data

(63) Continuation of application No. 13/839,266, filed on Mar. 15, 2013, now Pat. No. 10,304,091.

(60) Provisional application No. 61/640,647, filed on Apr. 30, 2012.

(51) Int. Cl.
*G06Q 30/02* (2012.01)
(52) U.S. Cl.
CPC .............. *G06Q 30/0268* (2013.01)
(58) Field of Classification Search
CPC .................................. G06Q 30/0268
See application file for complete search history.

(56) References Cited

U.S. PATENT DOCUMENTS

| 5,715,445 A | 2/1998 | Wolfe |
| 5,870,770 A | 2/1999 | Wolfe |
| 5,946,682 A | 8/1999 | Wolfe |

(Continued)

FOREIGN PATENT DOCUMENTS

| KR | 10-2008-0036829 A | 4/2008 |
| WO | 00/79456 A2 | 12/2000 |

(Continued)

OTHER PUBLICATIONS

"Next Step for Groupon Scheduler," Groublogpon—The Sereous Blog of Froupon, Mar. 18, 2012. [Retrieved from the Internet Mar. 26, 2012: <http://www.groupon.com/blog/cities.next-step-groupon-scheduler/>.

(Continued)

*Primary Examiner* — Azam A Ansari
(74) *Attorney, Agent, or Firm* — Alston & Bird LLP

(57) ABSTRACT

Systems, methods and computer readable media for providing a point-of-sale system that can be configured to facilitate the sale of products and transmit transaction data to a cloud based system are provided herein. The cloud based system can be maintained by a promotional party and be configured to generate deal offers and/or provide other services based on the transaction data received. In some embodiments, a fee may be charged for some or all of the services offered and/or the transactional data provided to the promotional system may be governed by an agreement between the promotional party and the merchant.

18 Claims, 6 Drawing Sheets

(56) References Cited

U.S. PATENT DOCUMENTS

| | | |
|---|---|---|
| 5,948,040 A | 9/1999 | Delorme et al. |
| 5,970,470 A | 10/1999 | Walker et al. |
| 6,006,252 A | 12/1999 | Wolfe |
| 6,049,778 A | 4/2000 | Walker et al. |
| 6,101,484 A | 8/2000 | Halbert et al. |
| 6,128,599 A | 10/2000 | Walker et al. |
| 6,151,603 A | 11/2000 | Wolfe |
| 6,154,172 A | 11/2000 | Piccionelli et al. |
| 6,249,772 B1 | 6/2001 | Walker et al. |
| 6,263,351 B1 | 7/2001 | Wolfe |
| 6,269,343 B1 | 7/2001 | Pallakoff |
| 6,292,813 B1 | 9/2001 | Wolfe |
| 6,301,576 B1 | 10/2001 | Wolfe |
| 6,327,573 B1 | 12/2001 | Walker et al. |
| 6,336,131 B1 | 1/2002 | Wolfe |
| 6,341,305 B2 | 1/2002 | Wolfe |
| 6,384,850 B1 | 5/2002 | McNally et al. |
| 6,415,262 B1 | 7/2002 | Walker et al. |
| 6,463,265 B1 | 10/2002 | Cohen et al. |
| 6,477,581 B1 | 11/2002 | Carpenter et al. |
| 6,584,451 B1 | 6/2003 | Shoham et al. |
| 6,604,089 B1 | 8/2003 | Van et al. |
| 6,604,103 B1 | 8/2003 | Wolfe |
| 6,631,356 B1 | 10/2003 | Van et al. |
| 6,754,636 B1 | 6/2004 | Walker et al. |
| 6,778,837 B2 | 8/2004 | Bade et al. |
| 6,812,851 B1 | 11/2004 | Dukach et al. |
| 6,836,476 B1 | 12/2004 | Dunn et al. |
| 6,842,719 B1 | 1/2005 | Fitzpatrick et al. |
| 6,876,983 B1 | 4/2005 | Goddard et al. |
| 6,901,374 B1 | 5/2005 | Himes |
| 6,918,039 B1 | 7/2005 | Hind et al. |
| 6,928,416 B1 | 8/2005 | Bertash |
| 6,931,130 B1 | 8/2005 | Kraft et al. |
| 6,934,690 B1 | 8/2005 | Van et al. |
| 6,937,868 B2 | 8/2005 | Himmel et al. |
| 6,970,837 B1 | 11/2005 | Walker et al. |
| 6,970,922 B1 | 11/2005 | Spector |
| 6,985,879 B2 | 1/2006 | Walker et al. |
| 7,000,116 B2 | 2/2006 | Bates et al. |
| 7,007,013 B2 | 2/2006 | Davis et al. |
| 7,039,603 B2 | 5/2006 | Walker et al. |
| 7,043,526 B1 | 5/2006 | Wolfe |
| 7,072,848 B2 | 7/2006 | Boyd et al. |
| 7,080,029 B1 | 7/2006 | Fallside et al. |
| 7,103,365 B2 | 9/2006 | Myllymaki |
| 7,103,565 B1 | 9/2006 | Vaid |
| 7,103,594 B1 | 9/2006 | Wolfe |
| 7,107,228 B1 | 9/2006 | Walker et al. |
| 7,107,230 B1 | 9/2006 | Halbert et al. |
| 7,113,797 B2 | 9/2006 | Kelley et al. |
| 7,124,099 B2 | 10/2006 | Mesaros |
| 7,124,107 B1 | 10/2006 | Pishevar et al. |
| 7,124,186 B2 | 10/2006 | Piccionelli |
| 7,146,330 B1 | 12/2006 | Alon et al. |
| 7,181,419 B1 | 2/2007 | Mesaros |
| 7,194,427 B1 | 3/2007 | Van et al. |
| 7,236,944 B1 | 6/2007 | Schwartz et al. |
| 7,246,310 B1 | 7/2007 | Wolfe |
| 7,251,617 B1 | 7/2007 | Walker et al. |
| 7,257,604 B1 | 8/2007 | Wolfe |
| 7,263,498 B1 | 8/2007 | Van et al. |
| 7,274,941 B2 | 9/2007 | Cole et al. |
| 7,289,815 B2 | 10/2007 | Gfeller et al. |
| 7,302,638 B1 | 11/2007 | Wolfe |
| 7,318,041 B2 | 1/2008 | Walker et al. |
| 7,340,691 B2 | 3/2008 | Bassett et al. |
| 7,349,879 B2 | 3/2008 | Alsberg et al. |
| 7,363,246 B1 | 4/2008 | Van et al. |
| 7,376,580 B1 | 5/2008 | Walker et al. |
| 7,406,332 B1 | 7/2008 | Gaillard et al. |
| 7,409,429 B2 | 8/2008 | Kaufman et al. |
| 7,428,418 B2 | 9/2008 | Cole et al. |
| 7,430,520 B1 | 9/2008 | Haugen et al. |
| 7,430,521 B2 | 9/2008 | Walker et al. |
| 7,433,874 B1 | 10/2008 | Wolfe |
| 7,447,642 B2 | 11/2008 | Bodin |
| 7,467,137 B1 | 12/2008 | Wolfe |
| 7,469,138 B2 | 12/2008 | Dayar et al. |
| 7,472,109 B2 | 12/2008 | Katibah et al. |
| 7,480,627 B1 | 1/2009 | Van et al. |
| 7,529,542 B1 | 5/2009 | Chevion et al. |
| 7,536,385 B1 | 5/2009 | Wolfe |
| 7,539,742 B2 | 5/2009 | Spector |
| 7,577,581 B1 | 8/2009 | Schuyler |
| 7,589,628 B1 | 9/2009 | Brady, Jr. |
| 7,613,631 B2 | 11/2009 | Walker et al. |
| 7,627,498 B1 | 12/2009 | Walker et al. |
| 7,643,836 B2 | 1/2010 | McMahan et al. |
| 7,650,307 B2 | 1/2010 | Stuart |
| 7,668,832 B2 | 2/2010 | Yeh et al. |
| 7,672,897 B2 | 3/2010 | Chung et al. |
| 7,689,468 B2 | 3/2010 | Walker et al. |
| 7,689,469 B1 | 3/2010 | Mesaros |
| 7,693,736 B1 | 4/2010 | Chu et al. |
| 7,693,748 B1 | 4/2010 | Mesaros |
| 7,693,752 B2 | 4/2010 | Jaramillo |
| 7,702,560 B1 | 4/2010 | Wiesehuegel et al. |
| 7,711,604 B1 | 5/2010 | Walker et al. |
| 7,720,743 B1 | 5/2010 | Marks |
| 7,725,480 B2 | 5/2010 | Bassett et al. |
| 7,734,779 B1 | 6/2010 | Piccionelli |
| 7,760,112 B2 | 7/2010 | Bauchot et al. |
| 7,774,453 B2 | 8/2010 | Babu et al. |
| 7,783,279 B2 | 8/2010 | Ramanathan et al. |
| 7,788,281 B2 | 8/2010 | Cole et al. |
| 7,791,487 B2 | 9/2010 | Meyer |
| 7,792,297 B1 | 9/2010 | Piccionelli et al. |
| 7,797,170 B2 | 9/2010 | Bodin |
| 7,848,765 B2 | 12/2010 | Phillips et al. |
| 7,860,753 B2 | 12/2010 | Walker et al. |
| 7,870,229 B2 | 1/2011 | Spector |
| 7,890,364 B2 | 2/2011 | Piccionelli |
| 8,010,417 B2 | 8/2011 | Walker et al. |
| 8,103,519 B2 * | 1/2012 | Kramer ............... G06Q 30/02 705/1.1 |
| 8,108,249 B2 | 1/2012 | Schroeder et al. |
| 8,131,619 B1 | 3/2012 | Veselka |
| 8,150,735 B2 | 4/2012 | Walker et al. |
| 8,204,797 B2 | 6/2012 | Wanker |
| 8,284,061 B1 | 10/2012 | Dione |
| 8,301,495 B2 | 10/2012 | Mason |
| 8,355,948 B2 | 1/2013 | Mason |
| 8,364,501 B2 | 1/2013 | Rana et al. |
| 8,407,252 B2 | 3/2013 | Bennett et al. |
| 8,650,072 B2 | 2/2014 | Mason et al. |
| 8,650,079 B2 | 2/2014 | Fano et al. |
| 8,725,597 B2 | 5/2014 | Mauseth et al. |
| 9,111,323 B2 | 8/2015 | Freeman |
| 2002/0023010 A1 | 2/2002 | Rittmaster et al. |
| 2002/0065713 A1 | 5/2002 | Awada et al. |
| 2002/0103746 A1 | 8/2002 | Moffett |
| 2002/0116260 A1 | 8/2002 | Szabo et al. |
| 2002/0123930 A1 | 9/2002 | Boyd et al. |
| 2002/0188511 A1 | 12/2002 | Johnson et al. |
| 2003/0004802 A1 | 1/2003 | Callegari |
| 2003/0018559 A1 | 1/2003 | Chung et al. |
| 2003/0033587 A1 | 2/2003 | Ferguson et al. |
| 2003/0055765 A1 | 3/2003 | Bernhardt |
| 2004/0039626 A1 | 2/2004 | Voorhees |
| 2004/0116074 A1 | 6/2004 | Fujii et al. |
| 2004/0117246 A1 | 6/2004 | Applebaum |
| 2004/0148228 A1 | 7/2004 | Kwei |
| 2004/0186789 A1 | 9/2004 | Nakashima |
| 2004/0193489 A1 | 9/2004 | Boyd et al. |
| 2004/0243478 A1 | 12/2004 | Walker et al. |
| 2005/0043996 A1 | 2/2005 | Silver |
| 2005/0075945 A1 | 4/2005 | Hodge et al. |
| 2005/0080675 A1 | 4/2005 | Lovegreen et al. |
| 2005/0102156 A1 | 5/2005 | Linduff |
| 2005/0182680 A1 | 8/2005 | Jones et al. |
| 2005/0221841 A1 | 10/2005 | Piccionelli et al. |
| 2005/0245241 A1 | 11/2005 | Durand et al. |
| 2006/0069619 A1 | 3/2006 | Walker et al. |

(56) References Cited

U.S. PATENT DOCUMENTS

| | | |
|---|---|---|
| 2006/0085259 A1 | 4/2006 | Nicholas et al. |
| 2006/0089882 A1 | 4/2006 | Shimansky |
| 2006/0106678 A1 | 5/2006 | Walker et al. |
| 2006/0161599 A1 | 7/2006 | Rosen |
| 2006/0178932 A1 | 8/2006 | Lang |
| 2006/0195368 A1 | 8/2006 | Walker et al. |
| 2006/0218043 A1 | 9/2006 | Rosenzweig et al. |
| 2006/0224465 A1 | 10/2006 | Walker et al. |
| 2006/0224466 A1 | 10/2006 | Walker et al. |
| 2006/0224467 A1 | 10/2006 | Walker et al. |
| 2006/0235754 A1 | 10/2006 | Walker et al. |
| 2006/0242028 A1 | 10/2006 | Walker et al. |
| 2006/0242036 A1 | 10/2006 | Walker et al. |
| 2006/0265289 A1 | 11/2006 | Bellissimo |
| 2007/0061209 A1 | 3/2007 | Jackson |
| 2007/0061220 A1 | 3/2007 | Vaid |
| 2007/0150354 A1 | 6/2007 | Walker et al. |
| 2007/0150371 A1 | 6/2007 | Gangji |
| 2007/0156529 A1 | 7/2007 | Walker et al. |
| 2007/0198360 A1 | 8/2007 | Rogers et al. |
| 2007/0208625 A1 | 9/2007 | Walker et al. |
| 2007/0225077 A1 | 9/2007 | Piccionelli |
| 2007/0280269 A1 | 12/2007 | Rosenberg |
| 2007/0281692 A1 | 12/2007 | Bucher et al. |
| 2007/0288330 A1 | 12/2007 | Vaid |
| 2008/0004888 A1 | 1/2008 | Davis et al. |
| 2008/0015938 A1 | 1/2008 | Haddad et al. |
| 2008/0027810 A1 | 1/2008 | Lerner et al. |
| 2008/0040211 A1* | 2/2008 | Walker ............... G06Q 30/0247 705/14.38 |
| 2008/0052186 A1 | 2/2008 | Walker et al. |
| 2008/0052189 A1 | 2/2008 | Walker et al. |
| 2008/0065490 A1 | 3/2008 | Novick et al. |
| 2008/0065565 A1 | 3/2008 | Walker et al. |
| 2008/0071622 A1 | 3/2008 | Walker et al. |
| 2008/0097857 A1 | 4/2008 | Walker et al. |
| 2008/0133336 A1 | 6/2008 | Altman et al. |
| 2008/0154714 A1 | 6/2008 | Liu et al. |
| 2008/0162318 A1 | 7/2008 | Butler et al. |
| 2008/0167991 A1 | 7/2008 | Carlson et al. |
| 2008/0201232 A1 | 8/2008 | Walker et al. |
| 2008/0208663 A1 | 8/2008 | Walker et al. |
| 2008/0208744 A1 | 8/2008 | Arthur et al. |
| 2008/0242514 A1 | 10/2008 | Piccionelli et al. |
| 2008/0255973 A1* | 10/2008 | El Wade ............... G06Q 40/02 705/35 |
| 2009/0006182 A1 | 1/2009 | Gammon |
| 2009/0024450 A1* | 1/2009 | Chen ............... G06Q 30/0202 705/7.31 |
| 2009/0024484 A1 | 1/2009 | Walker et al. |
| 2009/0027286 A1 | 1/2009 | Ohishi et al. |
| 2009/0030776 A1 | 1/2009 | Walker et al. |
| 2009/0037286 A1 | 2/2009 | Foster |
| 2009/0070263 A1 | 3/2009 | Davis et al. |
| 2009/0094109 A1 | 4/2009 | Aaronson et al. |
| 2009/0125414 A1 | 5/2009 | Kleinrock et al. |
| 2009/0150218 A1 | 6/2009 | Brunner et al. |
| 2009/0167553 A1 | 7/2009 | Hong et al. |
| 2009/0192935 A1 | 7/2009 | Griffin et al. |
| 2009/0234710 A1* | 9/2009 | Belgaied Hassine ........................ G06Q 30/0206 705/7.29 |
| 2009/0271270 A1* | 10/2009 | Regmi ............... G06Q 30/0217 705/14.56 |
| 2009/0271275 A1 | 10/2009 | Regmi et al. |
| 2009/0307067 A1 | 12/2009 | Obermeyer |
| 2009/0313109 A1 | 12/2009 | Bous et al. |
| 2010/0049601 A1 | 2/2010 | Walker et al. |
| 2010/0057586 A1 | 3/2010 | Chow |
| 2010/0063870 A1* | 3/2010 | Anderson ............... G06Q 10/10 705/7.29 |
| 2010/0070288 A1 | 3/2010 | Pandey et al. |
| 2010/0070303 A1 | 3/2010 | Massoumi et al. |
| 2010/0076832 A1 | 3/2010 | Cha |
| 2010/0082481 A1 | 4/2010 | Lin et al. |
| 2010/0094701 A1 | 4/2010 | Ghosh et al. |
| 2010/0114132 A1 | 5/2010 | Piccionelli et al. |
| 2010/0146604 A1 | 6/2010 | Piccionelli |
| 2010/0185465 A1 | 7/2010 | Rana et al. |
| 2010/0205004 A1 | 8/2010 | Aldrich |
| 2010/0241513 A1 | 9/2010 | Prasad et al. |
| 2010/0287103 A1 | 11/2010 | Mason |
| 2011/0029362 A1 | 2/2011 | Roeding et al. |
| 2011/0029363 A1 | 2/2011 | Gillenson et al. |
| 2011/0035266 A1 | 2/2011 | Patterson |
| 2011/0040609 A1* | 2/2011 | Hawkins ............... G06Q 30/02 705/14.25 |
| 2011/0054996 A1 | 3/2011 | Spector |
| 2011/0090080 A1* | 4/2011 | Yu ............... G06Q 30/0201 340/539.13 |
| 2011/0099082 A1 | 4/2011 | Walker et al. |
| 2011/0112892 A1* | 5/2011 | Tarantino ............... G07F 17/32 705/14.1 |
| 2011/0153400 A1 | 6/2011 | Averbuch |
| 2011/0173096 A1 | 7/2011 | Bui |
| 2011/0213644 A1* | 9/2011 | Phene ............... G06Q 30/0207 705/14.1 |
| 2011/0218911 A1 | 9/2011 | Spodak |
| 2011/0231321 A1 | 9/2011 | Milne |
| 2011/0238499 A1 | 9/2011 | Blackhurst et al. |
| 2011/0258049 A1 | 10/2011 | Ramer et al. |
| 2011/0313840 A1 | 12/2011 | Mason et al. |
| 2011/0313867 A9 | 12/2011 | Silver |
| 2012/0016745 A1 | 1/2012 | Hendrickson |
| 2012/0030002 A1 | 2/2012 | Bous et al. |
| 2012/0030066 A1 | 2/2012 | Stringfellow et al. |
| 2012/0036042 A1 | 2/2012 | Graylin et al. |
| 2012/0054031 A9 | 3/2012 | Walker et al. |
| 2012/0088487 A1 | 4/2012 | Khan |
| 2012/0095852 A1 | 4/2012 | Bauer et al. |
| 2012/0101881 A1 | 4/2012 | Taylor et al. |
| 2012/0101889 A1 | 4/2012 | Kurata et al. |
| 2012/0130796 A1 | 5/2012 | Busch |
| 2012/0150603 A1 | 6/2012 | Bennett et al. |
| 2012/0150653 A1 | 6/2012 | Bennett et al. |
| 2012/0172062 A1 | 7/2012 | Altman et al. |
| 2012/0173350 A1 | 7/2012 | Robson |
| 2012/0209730 A1 | 8/2012 | Garrett |
| 2012/0254020 A1 | 10/2012 | Debow |
| 2012/0259711 A1 | 10/2012 | Jabbawy |
| 2012/0284100 A1 | 11/2012 | Goldberg |
| 2012/0303434 A1 | 11/2012 | Postrel |
| 2012/0323661 A1 | 12/2012 | Otto et al. |
| 2013/0024364 A1 | 1/2013 | Shrivastava et al. |
| 2013/0085804 A1* | 4/2013 | Leff ............... G06Q 30/0219 705/7.29 |
| 2013/0124281 A1 | 5/2013 | Evans et al. |
| 2013/0231999 A1 | 9/2013 | Emrich et al. |
| 2013/0254104 A1 | 9/2013 | Fernandez |
| 2013/0275242 A1 | 10/2013 | Ramaratnam et al. |
| 2013/0317894 A1 | 11/2013 | Zhu et al. |
| 2014/0046757 A1 | 2/2014 | Kahn et al. |
| 2014/0074580 A1 | 3/2014 | Khuchua-Edelman et al. |
| 2014/0095232 A1 | 4/2014 | Shiva et al. |
| 2014/0122200 A1 | 5/2014 | Granville |
| 2014/0207584 A1 | 7/2014 | Wicha et al. |
| 2015/0046271 A1 | 2/2015 | Scholl et al. |
| 2015/0278864 A1* | 10/2015 | McDevitt ............... G06Q 30/0261 705/14.58 |

FOREIGN PATENT DOCUMENTS

| | | |
|---|---|---|
| WO | 00/79495 A2 | 12/2000 |
| WO | 01/08024 A2 | 2/2001 |
| WO | 01/11483 A2 | 2/2001 |
| WO | 01/50301 A2 | 7/2001 |
| WO | 2009/094385 A2 | 7/2009 |
| WO | 2011/112752 A1 | 9/2011 |
| WO | 2014/052882 A2 | 4/2014 |

(56) References Cited

FOREIGN PATENT DOCUMENTS

| WO | 2014/062229 A1 | 4/2014 |
|---|---|---|
| WO | 2014/062230 A1 | 4/2014 |

OTHER PUBLICATIONS

Alan S. Davis "Group Buying on the Internet", Seminar Presentation Slides, University of Minnesota, MIS Research Center, Mar. 10, 2006.
Bermant, Charles, "ActBig: Save BiG", Internetnews.com, Nov. 16, 1999, 3 pgs.
Editor, "Technology Drives ActBig 'Next Generation' GroupBuying Application", Market Wire, Feb. 29, 2005.
International Search Report and Written Opinion for Application No. PCT/US201.2/027616 dated Sep. 27, 2012.
Kauffman, Robert J. et al., "Bid Together, Buy Together: On The Efficacy Of Group-Buying Business Models In Internet Based Selling", paper prepared for the 5th Annual University of Minnesota Electronic Commerce conference, Mar. 27-28, 2001, Carlson School of Management, University of Minnesota, MN, 44 pgs.
Krishnan S, Anand and Ravi Aron (OPIM Department, The Wharton School, University of Pennsylvania), Group Buying on the Web: A Comparison of Price Discovery Mechanisms, Management Science, vol. 49, No. 11, pp. 1546-1562, Nov. 2003.
PCT international Preliminary Report on Patentability for Application PCT/US2013/033145 dated Apr. 21, 2015.
PCT international Preliminary Report on Patentability for Application PCT/US2013/033169 dated Apr. 21, 2015.
PCT international Preliminary Report on Patentability for Application PCT/US2013/062389 dated Mar. 31, 2015.
PCT International Search Report and Wnten Opinion of the International Searching Authority for application PCT/JS2013/062389 dated May 27, 2014.
PCT international Search Report and Written Opinion of the International Searching Authority for Application PCT/US2013/033145 dated Jun. 21, 2013.
PCT international Search Report and Written Opinion of the International Searching Authority for Application PCT/US2013/062389 dated May 27, 2014.
PCT international Search Report for Application PCT/US2013/033169 dated Jun. 10, 2013.
PCT Written Opinion of the International Searching Authority for Application PCT/US2013/033169 dated Jun. 10, 2013.
Rueb, Emily S., "Group Buying, Better Together", The New York Times City Blog, Feb. 16, 2010, 3 pgs.
Staff, "ActBig.com muscles in on group buying power", RedHerring.com, Oct. 13, 1999.
U.S. Patent Application filed Mar. 15, 2013, U.S. Appl. No. 13/832,804.
U.S. Patent Application filed Sep. 28, 2012, In re: Shiva entitled "Scheduling Appointments With Deal Offers", U.S. Appl. No. 13/631,313.
U.S. Provisional Application filed Aug. 13, 2012, In re: Shariff et al. entitled Unified payment and Return On Ivestment System, U.S. Appl. No. 61/682,762.
U.S. Provisional Application filed Jun. 18, 2012, In re; Kim et al. entitled Facilitating Consumer Payments And Redemptions Of Deal Offers, U.S. Appl. No. 61/661,291.
U.S. Provisional Application filed Mar. 30, 2012, In re: Kim entitled "Generating Deal Offers and Providing Analytics Data", U.S. Appl. No. 61/618,338.
U.S. Provisional Application filed May 17, 2013; In re: Kahn et al., entitled Unified Payment and Return on Investment System, U.S. Appl. No. 61/824,850.
U.S. Provisional Patent Application filed Feb. 27, 2013, U.S. Appl. No. 61/770,174.
Kothari et al., Robust Indoor Localization on a Commercial Smart Phone, Elsevier Ltd., 1114-1120, www.sciencedirect.com.

* cited by examiner

DEAL GENERATION USING POINT-OF-SALE SYSTEMS AND RELATED METHODS

CROSS-REFERENCE TO RELATED APPLICATIONS

This application is a continuation of U.S. patent application Ser. No. 13/839,226, filed Mar. 15, 2013, which claims the benefit of U.S. Provisional Patent Application No. 61/640,647, filed Apr. 30, 2012, each of which are incorporated herein by reference in their entireties.

FIELD

Embodiments of the invention relate, generally, to facilitating sales by merchants and, more particularly, to providing point-of-sale related functionality.

BACKGROUND

Merchants sell goods and services (collectively referred to herein as "products") to consumers. The merchants can often control the form of their product offers, the timing of their product offers, and the price at which the products will be offered. The merchant may sell products at a brick-and-mortar sales location, a virtual online site, or both.

Discounts have been used as part of some retail strategies. Discount techniques include providing coupons and rebates to potential consumers, but these techniques have several disadvantages. In this regard, areas of improvement for the systems used to receive payment and provide discounts to consumers have been identified. Through applied effort, ingenuity, and innovation, solutions to improve such systems have been realized and are described in connection with embodiments of the present invention.

BRIEF SUMMARY

In general, embodiments of the present invention provided herein include systems, methods and computer readable media for facilitating sales to consumer using a point-of-sale system. For example, provided herein is a method of generating a deal offer, comprising: receiving transaction data from a point-of-sale system related to one or more transactions conducted by a merchant; analyzing the transaction data; programmatically generating a deal offer based on the analysis of the transaction data; and providing the deal offer to consumers. The transaction data can include a sales purchase history, consumer information, prices, profitability (purchase price minus costs), quantities, timestamps, cashier information, merchant identifying information, etc., some or all of which may be collected using the point-of-sale system.

For example, analyzing the transaction data can include analyzing sale values and timestamps of one or more sales to determine a time of day during which the merchant tends to have a lull in transactions. A time restricted deal offer may then be generated and suggested to the merchant. As another example, analyzing the transaction data can include analyzing the values and the timestamps of one or more sales to determine a time of day during which the merchant tends to have a lull in a particular type of sales, such as high value and/or profitable transactions. A time and product restricted deal offer may then be generated and suggested to the merchant for the high value products (or products that complement the high value products) during a predetermined period of time (e.g., 10:00 am to noon, Wednesdays, weekdays, and/or any other time period). For example, installing tires may be a very profitable service that a merchant offers, so during a time when there is traditionally a lull in business (e.g., Wednesdays between 2:00-5:00 pm), the merchant may offer a 10% discount on new tires (after, for example, the promotional system determines there is a correlation between tire sales and tire installation at the merchant and/or at other merchants).

The deal offer can be generated in response to receiving an indication of the merchant authorizing a promotional system to execute a promotional campaign using the transaction data. For example, the promotional campaign can include offering programmatically generated deals and/or distributing other marketing materials to consumers. The programmatically generating of the deal offer can be based upon additional transaction data from a plurality of other point-of-sale systems in addition to the transaction data from the point-of-sale system. The other point-of-sale systems and the point-sale-system can all be associated with the same merchant or can be associated with at least two different merchants.

The merchant can also be enabled remote access to the transaction data collected and/or otherwise generated based on information collected by the merchant's point-of-sale system. For example, the point-of-sale system configuration (such as products offered, prices, etc.) can be configured remotely. The deal offer can be generated based on consumer data received from a consumer device in addition to the transaction data received from one or more point-of-sale systems. The promotional system can also be configured to generate a report including sales analytics, among other things, based on the analysis of the transaction data and then provide the report to the merchant and/or other third party (e.g., at the merchant's request). A selectable option can be provided with the report, and, in response to determining the merchant selected the option, the deal offer can be provided to consumers by the promotional system. In some embodiments, the deal offer may be in the form or one or more impressions (e.g., a communication, a display, or other perceived indication, such as a flyer, print media, e-mail, text message, application alert, mobile applications, other type of electronic interface or distribution channel and/or the like) that each may include an indication of the deal offer. Furthermore, the deal offer may be for a transaction with the merchant or a second merchant.

Some embodiments may provide for a promotional system. The promotional system may include processing circuitry configured to: receive transaction data from a point-of-sale system related to one or more transactions conducted by a merchant, wherein the transaction data includes timestamps and values associated with each sale made by the merchant; analyze the transaction data, including the values and the timestamps; programmatically generate a deal offer based on the analysis of the transaction data; and provide the deal offer to consumers.

In some embodiments, the processing circuitry is of the promotional system may be further configured to analyze the transaction data, including the values and the timestamps, by determining a time of day during which the merchant tends to have a lull in transactions. Additionally and/or alternatively, the processing circuitry may be configured to analyze the transaction data, including the values and the timestamps, by determining a time of day during which the merchant tends to have a lull in high value transactions.

In some embodiments, the processing circuitry of the promotional system may be further configured to generate the deal offer in response to receiving an indication of the merchant authorizing the promotional system to execute a promotional campaign using the transaction data.

In some embodiments, the processing circuitry of the promotional system may be further configured to programmatically generate the deal offer based upon additional transaction data from a plurality of other point-of-sale systems in addition to the transaction data from the point-of-sale system. The plurality of other point-of-sale systems and the point-of-sale system may all be associated with the merchant. Alternatively and/or additionally, the plurality of other point-of-sale systems and the point-sale-system may all be associated with the merchant and at least one other unrelated merchant.

In some embodiments, the processing circuitry of the promotional system may be further configured to configure the point-of-sale system remotely and/or to enable the merchant to access the transaction data from a machine located remote from the point-of-sale system.

In some embodiments, the processing circuitry of the promotional system may be further configured to: receive consumer data from a consumer device; analyze the consumer data; and generate the deal offer is based on the analysis of the transaction data and the analysis of the consumer data.

In some embodiments, the processing circuitry of the promotional system may be further configured to: generate a report including sales analytics based on the analysis of the transaction data; and provide the report to the merchant. A selectable option may be provided with the report, and, the processing circuitry may be further configured to provide the deal offer to consumers in response to determining the merchant selected the option.

Some embodiments may provide for a merchant device. The merchant device, for example, may be part of a point-of-sale system associated with a merchant. The merchant device may include processing circuitry configured to: send transaction data related to one or more transactions conducted by a merchant to a promotional system, wherein the transaction data includes timestamps and values associated with each sale made by the merchant; receive deal information indicating redemption of a deal offer programmatically generated by the promotional system based on the transaction data; and apply a discount associated with the deal offer to a consumer purchase.

Some embodiments may include one or more machines, such as an apparatus and/or system, configured to implement the methods and/or other functionality discussed herein. For example, the machine may include one or more processors and/or other machine components configured to implement the functionality discussed herein based on instructions and/or other data stored in memory and/or other non-transitory computer readable media.

These characteristics as well as additional features, functions, and details of the present invention are described below. Similarly, corresponding and additional embodiments are also described below.

BRIEF DESCRIPTION OF THE SEVERAL VIEWS OF THE DRAWING(S)

Having thus described some embodiments in general terms, reference will now be made to the accompanying drawings, which are not necessarily drawn to scale, and wherein:

DETAILED DESCRIPTION

Figure 1:
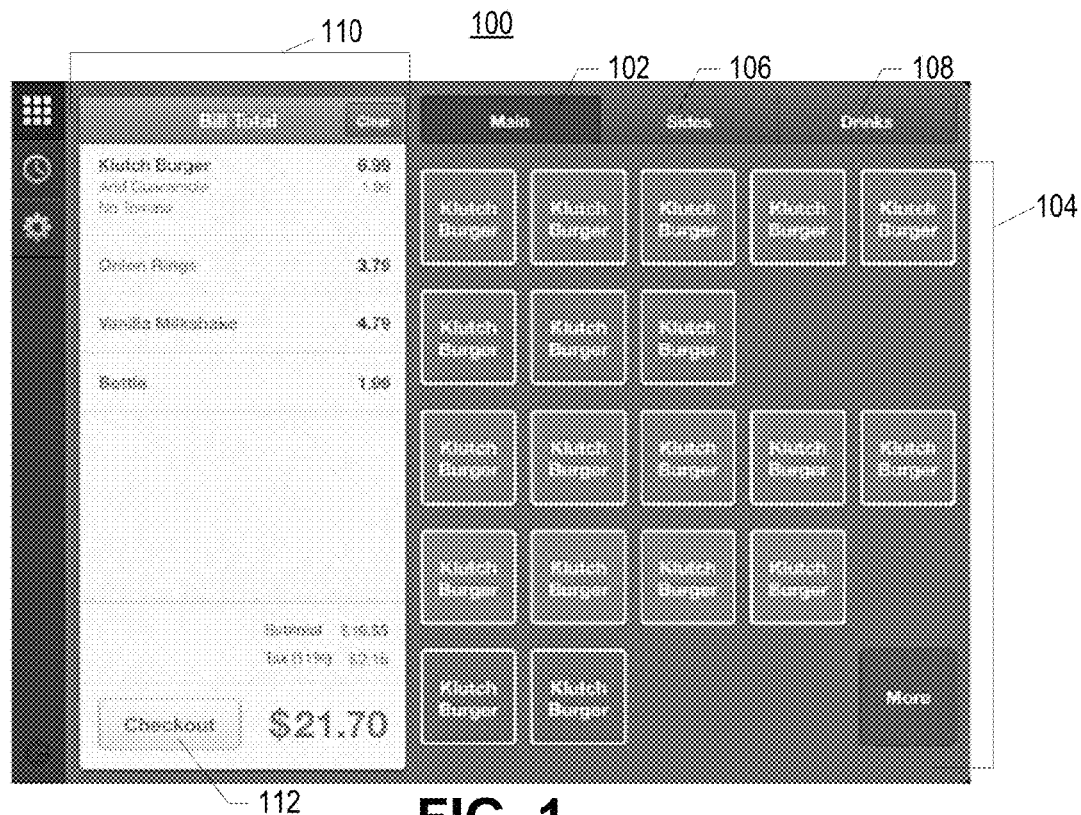
FIGS. 1-6 show example graphical user interface displays that may be presented by various components of systems in accordance with some embodiments discussed herein.

Embodiments now will be described more fully hereinafter with reference to the accompanying drawings, in which some, but not all embodiments are shown. Indeed, embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

FIGS. 1-6 show example displays that may be presented by one or more display screens of one or more machines, sometimes referred to herein as "merchant devices," in accordance with some embodiments discussed herein. For example, the displays of FIGS. 1-6 can be presented to a merchant and/or other user (e.g., a consumer) by a merchant device that is embodied as a tablet computer, handheld device (e.g., cellular telephone), laptop computer, desktop computer and/or any other type of computing device. The displays of FIGS. 1-6 can be configured to aid in facilitating the merchant device functioning as a point-of-sale machine that receives payment for products, tracks transactional data (e.g., time of sale, date of sale, payment type, payment amount, discount information, quantity information, etc.), and/or otherwise facilitates merchant services. For example, the point-of-sale machine can also be configured to facilitate the redemption of a coupon and/or other discount offer for a merchant's product(s), which are sometimes referred to herein as "deal offers" or, more simply, "deals." The deals redeemed in accordance with some embodiments discussed herein may have been generated and/or tracked by one or more promotional systems, which can also be configured to present the deals to one or more consumers using machines, which are sometimes referred to herein as "consumer devices." Additional examples of merchant devices, promotional systems and consumer devices (as well as their components) are discussed in connection with, e.g., FIGS. 7, 8 and 10.

FIGS. 1-6 are shown as being optimized for currently popular, commercially-available machines that include a touchscreen input/output component and, as such, may be implemented less expensively and without complicated, proprietary hardware. The merchant devices may also utilize cloud computing and storage functionality, a network printing device, barcode reading device (e.g., optical camera) and/or a credit card swiper (e.g., magnetic strip reader). The merchant device may also be configured to store locally and/or access a consumer profile stored in a remote database, wherein the consumer profile is associated with a form of payment (e.g., the consumer's credit card account information, bank account information, debit card information, and/or other payment account information), user identifying information (e.g., consumer's name, picture, payment history, purchase history, password, pin code, and/or any other information that a merchant may use to uniquely identify a consumer), previously purchased deals, previously purchased products (for which possession may yet to be transferred to the consumer, sometimes referred to herein as "order ahead"), consumer appointment information, and/or other information associated with the consumer that may be used to facilitate a transaction by the merchant device. Example network infrastructure and remote databases, such as those that may be maintained by a promotional system used to facilitate payments and offer deals, are discussed further in connection with FIG. 7.

FIGS. 1-6 show example displays that may be used by merchants in one or more verticals (such as, table service, health & beauty, among others) and/or horizontals by payment solution (e.g., cash-only, credit card only, payment based on consumer identity confirmation, etc.). Although many of the examples discussed herein are related to food services embodiments, one or more of the displays discussed herein can be modified or otherwise optimized to provide functionality unique to other verticals and/or horizontals, such as health and beauty service providers (e.g., fitness centers, spas, hair salons, massage professionals, among others), retail outlets (e.g., clothing stores, food stores, etc.), hospitality providers (e.g., hotels, reception venues, etc.), transportation providers (e.g., airlines, taxicabs, busses, etc.), automobile mechanics, and/or any other type of business. For example, a machine device used in a retail clothing outlet may be configured to track the inventory of one or more particular articles of clothing.

The merchant device can be configured to be configured by the merchant, in some embodiments, similar to how applications are downloaded and installed from online application stores. The promotional system can also be used to configure the merchant device in some embodiments. In this manner, the point-of-sale functionality discussed herein can be associated with relatively low setup costs on one or more merchant devices at one or more geographic locations. Some and/or all versions of the point-of-sale functionality discussed herein may be provided without up-front licensing fees and/or in response to the provider of the point-of-sale functionality receiving a one-time or continuing licensing fee. Once configured, the merchant device can function as a point-of-sale machine with a relatively low cost of operation (e.g., remain functional in response to the point-of-sale provider receiving a simple monthly fee and/or a flat percentage for payments, and/or any other on-going fee structure, including free-of-charge).

The point-of-sale functionality of the merchant device may be updated and/or maintained as well in accordance with any suitable fee structure and/or service agreement. For example, updates and/or maintenance may be provided for free, for a fixed fee, and/or on a subscription basis. In some embodiments, phone, email, messaging, and/or any other type of support may be made available twenty-four hours a day seven days a week or during any other times. As yet another example, point-of-sale functionality can be provided for a reduced or no cost to the merchant in exchange for the merchant providing the provider of the point-of-sale functionality access to the data obtained by the merchant device (e.g., transaction data).

As noted further below, the point-of-sale functionality can be configured to work seamlessly with other types of services, such as deal services and others currently offered by Groupon, Inc. of Chicago, Ill. For example, the point-of-sale functionality of the merchant device can be integrated with Groupon's Rewards and Groupon Now® services. As another example, the point-of-sale functionality may be provided to merchants with a guarantee that a certain amount of customers per month visit the merchant and, if not, some or all of the fees associated with the use of the point-of-sale system can be waived. In some embodiments, in addition to or instead of a free guarantee, the guarantee can be provided as a form of fee-based insurance that may be sold to merchants or in exchange for the merchant agreeing to take part in a promotional campaign organized by the provider of the point of sale-of-sale system and/or provide transaction data captured and/or generated by the point-of-sale system to provider.

Turning now to FIG. 1, which shows display 100 that may be presented by a merchant device functioning as a point-of-sale machine when a merchant indicates a desire to enter the products the consumer is interested in purchasing. In some embodiments, one or more other displays (not shown) may be provided that include other options for starting a transaction between a merchant and a consumer. In this regard, like the other displays discussed herein, the merchant device can be configured to accommodate a particular merchant and/or category or subcategory of business that relate to, for example, categories of business maintained by a promotional party that also provides and/or otherwise supports the point-of-sale functionality for the merchant. As noted above, point-of-sale functionality can be related to one or more verticals, also sometimes referred to herein as categories/subcategories, of merchants. For example, a promotional party may offer deals and/or otherwise promote businesses that provide spa treatments. Each of these businesses can be categorized by the promotional party as a spa. As another example, businesses that serve food and drink after payment is received can be categorized as a "Deli/Coffee Shop" by the promotional system. In some embodiments, there may be broader categories and/or subcategories. For example, a "Spa" category may include a subcategory for a "Facial Specialist," and itself may be a subcategory for the broader "Health and Beauty" category. As another example, a "Deli/Coffee Shop" category may be a subcategory of a "Restaurants" category, which may itself be a subcategory of a "Food and Drink" category. The displays provided by the merchant device may be associated with the merchant's category/subcategory.

In the example of FIG. 1, while main option 102 is selected, product identifier section 104 may be displayed and include one or more selectable buttons that are each associated with one or more products offered for sale by the merchant. In some embodiments, the selectable buttons included in product identifier section 104 can be associated with products that are related to each other in some manner. For example, main dish items (such as hamburgers, sandwiches, etc.) may be associated with main option 102, side dish options may be associated with option 106 and drink options may be associated with option 108. In a retail environment, for example, various types of retail products may be associated with each other and organized in an intuitive way using options 102, 106 and 108 (and/or any other type of options).

In response to one of the buttons in product identifier section 104 being selected, the corresponding product and/or other related information may be displayed in bill total summary section 110. For example, in response to a button associated with a hamburger being selected, the name of the burger as programmed into the merchant device, the price of the hamburger, any product-related items selected thereafter (e.g., preparation details (rare, medium, well, etc.)), and/or any other information that may assist the merchant, consumer and/or third party (e.g., promotional system) facilitate the transaction may be displayed in bill total summary section 110. As buttons are selected from product identifier section 104, related options may be presented to the merchant. For example, in response to selecting a hamburger, side items may be automatically presented by changing the options included in product identifier section 104 to those associated with option 106. In some embodiments, the merchant may have to first select option 106 to have side item options included in product identifier section 104. In some embodiments, the point-of-sale system may be configured to enable other product modifiers to be manually added, such as no pickles, add bacon for $1, etc. (including customer modifiers, such as a note), by the merchant. As yet another example, in a retail clothing configuration, options for accessories may be presented after an item is entered (such as options for belts after ringing-up a pair of pants) and/or the merchant may be able to add notes as to how an item of clothing is to be altered by the seamstress or tailor. As yet another example, in a spa and beauty configuration, options for nail polish used during a manicure may be presented after ringing-up a manicure service that was or is about to be provided.

Display 100 may also include a running total cost of the products being purchased. The running total cost may be presented in bill total summary section 110, which may or may not include the local tax to be collected automatically calculated therein. In this regard, each of the buttons may also be associated with a flag indicating whether or not the represented products are taxable and, if so, what tax rate. For example, certain luxury items may be associated with a higher tax rate than non-luxury items and certain food items may be associated with a lower tax rate than non-food items. As yet another example, some embodiments can be configured to determine whether a food order is to-go or dine-in, which may have different tax rates.

Product identifier section 104 may include a more button and/or otherwise be configured to present additional options (e.g., in response to the user scrolling down). One or more of the button sin product identifier section 104 may be color-coordinated and/or otherwise grouped for the merchant. Once the consumer's complete order is entered, checkout button 112 may be selected by the merchant.

Figure 2:

FIG. 2 shows display 200, which is an example payment receiving display that may be presented in response to, for example, checkout button 112 being selected. Display 200 may present the total price at portion 202. Quick cash options 204 can be dynamically generated by the merchant device based upon the total price displayed in portion 202 of display 200. For example, quick cash options 202 can include a first option that is generated based on rounding up the total amount due to the nearest dollar, a second option that is generated based on rounding up the total amount due to the nearest dollar divisible by 5, a third option that is generated based on rounding up the total amount due to the nearest dollar divisible by 10, and/or a fourth option that is generated based on rounding up the total amount due to the nearest dollar divisible by 20. When the amount due exceeds a predetermined threshold (e.g., more than $150) one or more other options may be additionally or instead provided such as an option that is generated based on rounding up the total amount due to the nearest dollar divisible by 50 and/or 100. When the dollar amount is below a predetermined threshold (e.g., less than $5), some embodiments can be configured to instead or additionally provide one or more options in quick cash options 202 that include fractions of dollar (such as rounded up to the nearest 5 cents, 10 cents, and/or 25 cents). In some embodiments, portion 202 may also serve as input button that can be touched to indicate that the consumer has tendered cash equaling the exact amount due.

Although FIG. 2 (like other drawings discussed herein) is described in connection with U.S. dollars and the common denominations carried by many U.S. consumers (e.g., $1, $5, $10, and $20 bills), the displays discussed herein can be configured to be optimized or otherwise accommodate any type of currency and/or the denominations commonly used by the consumers of the products being offered for sale by the merchant and/or purchased during any particular transaction being conducted. In this regard, for example, the options and/or other features provided by the point-of-sale system can be configured to be dynamically selected based on particular transaction(s) and/or product(s) in addition to or instead of merchant category.

The merchant (or other type of user interacting with display 200) may also touch cash input portion 206 and/or credit card input portion 208 and use keypad 210 to enter a cash amount being tendered and/or account information for a credit card, debit card and/or any other form of payment accepted by the merchant. For example, in response to selecting cash input portion 206 and touch the "5" button and then the "0" button using keypad 210, the merchant device may determine that the consumer is tendering $50 to pay the total amount due. As another example, in response to touching card input portion 208, a card reading device (such as a magnetic reader and/or near field communication device) may be activated and/or otherwise used to read the consumer's account information. After the payment is tendered (in form of cash and/or account information), tender button 212 may be selected. Some embodiments discussed herein can be leveraged to provide lower transaction and/or other fees to the Merchants than what the Merchants may otherwise be paying.

In some embodiments, the point-of-sale machine can be configured to generate and transmit data to a remote device, wherein the data is representative of the information included in bill total summary section 110 and/or any other portion(s) of any other display(s) presented by the merchant device. For example, the merchant device can be configured, in response to the selection of tender button 212, checkout button 112 (of FIG. 1) and/or any other button associated with the point-of-sale machine, to cause a remote printer (such as a printer in a restaurant's kitchen), a remote display and/or other remote device to receive the information included in bill total summary section 110. The data can be transmitted in any suitable format, including comma separated values ("CSV") formatted file. In some embodiments, the merchant can configure the merchant device as to whether on-screen and/or paper charge slips are utilized. For example, the merchant can choose which to offer, and this setting can be changed on a per-terminal basis.

In some embodiments, the point-of-sale machine can be configured to receive a deal identifier. For example, the merchant can key in a code and/or use an image device (e.g., barcode reader, optical camera, etc.) to scan in a deal code. The merchant may then cause the deal to be applied to the current transaction. In some embodiments, the point-of-sale system may then communicate to a promotional system (that may also manage the deal offers) that the deal has been redeemed. Additional examples of promotional systems that can be configured to create, manage and enable consumers to redeem deals are discussed in commonly-assigned U.S. Patent Application Publication No. 2011/0313840, filed Mar. 17, 2011, titled "SYSTEM AND METHODS FOR PROVIDING LOCATION BASED DISCOUNT RETAILING," which is hereby incorporated by reference in its entirety.

Figure 3:
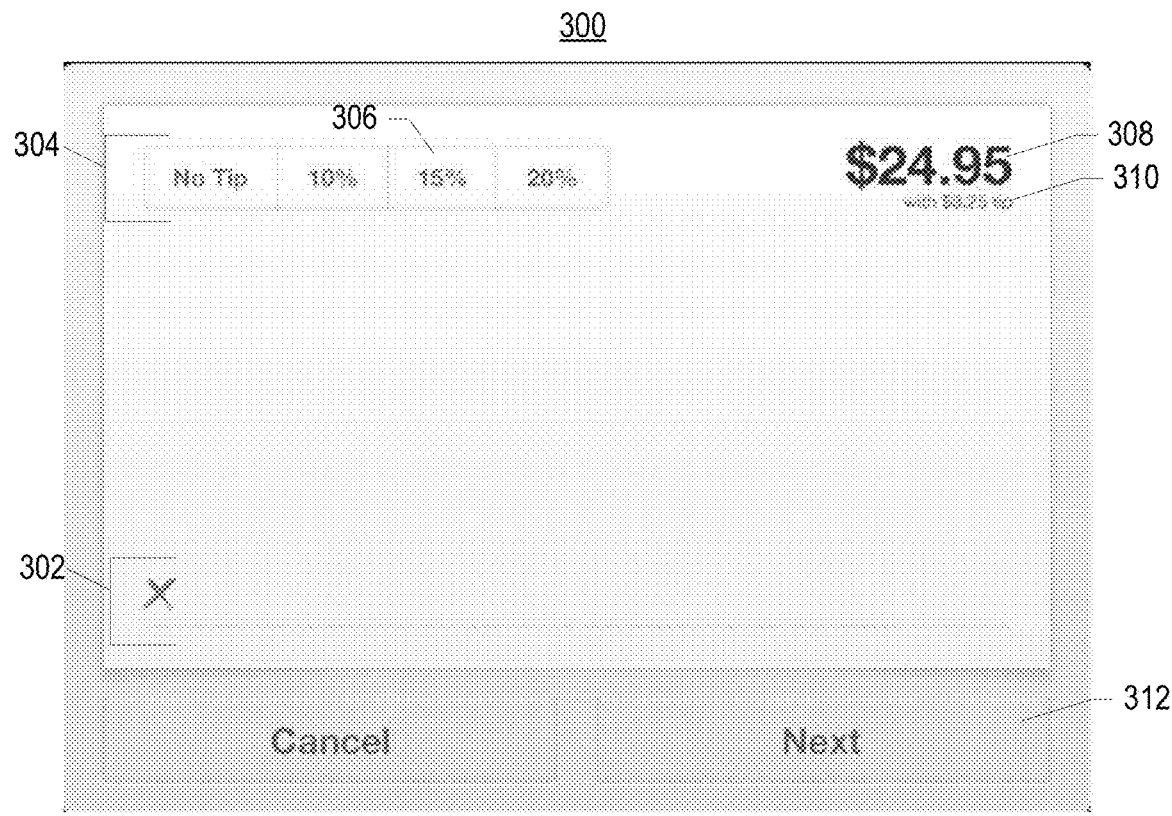

FIG. 3 shows display 300, which is one example of a display that may be presented in response to tender button 212 being selected. Display 300 can be presented in response to, for example, determining that a credit card transaction and/or other type of transaction that generally involves user approval has been submitted.

Signature line 302 may be configured to be included in some embodiments. For example, if the transaction exceeds a minimal dollar amount, signature line 302 may be included. As another example, when the merchant would like to provide the consumer an option to leave a tip, signature line 302 may be included.

Tip options 304 may also be included in some embodiments. Tip options 304 may include selectable options to leave no tip, a 10% tip, a 15% tip, a 20% tip and/or any other tip amount, including a user-entered tip amount. In some embodiments, one or more settings may be previously-saved and associated with a consumer profile and/or merchant profile. For example, a consumer's preferred tip amount, such as 17%, may be derived from, for example, a consumer profile created remotely with a promotional system, past tip(s) paid at this merchant by the consumer, and/or past tips paid by the consumer at other merchants, among other things. The consumer-specific default tip amount can be presented with (or separate from) tip options 304 in response to information identifying the user being received by the merchant device. Examples of information that may identify the user include payment information (e.g., credit card number), deal offer redemption code (which may be associated with a consumer's profile at a promotional system), information taken when the consumer made the appointment for the product(s) being purchased, and/or any other user-identifying data. Additionally or alternatively, the merchant can create their own specialized tip amounts that are included in display 300.

In response to the user selecting or otherwise entering a tip amount, the total amount due may be updated and displayed including the tip amount at display portion 308 with the amount of the tip in dollars and/or percentage displayed below in portion 310. For example, 15% of $21.70 is $3.25 and, in response to tip option 306 being selected, the total displayed at display portion 308 may be updated to include the sum of the tip amount with the previous total (e.g., shown in FIG. 2) and the tip amount in dollars, $2.35 in this example, can be displayed below the total dollar amount and/or anywhere else or, in some embodiments, the tip amount may not be displayed. In some embodiments, the merchant device may also or instead support tipping on paper. In some embodiments, where orders are lower than a predetermined threshold (e.g., less than $25) where signing is not officially required, the merchant can choose whether to force a signature (thus helping promote tipping). For paper charge slips, a "power flow" can be provided where the point-of-sale system can enable merchants to manually key the receipt identifier and tip amount to batch enter tips.

In some embodiments, the space above signature line 302 may present an agreement to which the user may be asked to agree to by signing. For example, the user may be provided a statement that by signing below, the consumer agrees to pay the amount shown above. As another example, additional warrantee information and/or any other information related to the transaction may be displayed. As yet another example, a deal offer can be provided to the consumer in the space provided above signature line 302 that may or may not be related to the transaction currently being agreed to by the consumer. The deal offer may be offered to the consumer free of charge or for a fee, and an accept button (not shown) may also be presented with the deal offer. As yet another example, an advertisement or other marketing material may be provided above signature line 302 that is paid for by the entity conveying its message. The merchant and/or a promotional party may receive payment for the advertisement. Merchant accepting the deal offer, the total amount shown in display portion 308 may be updated. After the consumer signs using a finger, stylus, and/or any other means, next button 312 may be selected indicating that the point-of-sale machine should advance to the next screen.

Figure 4:
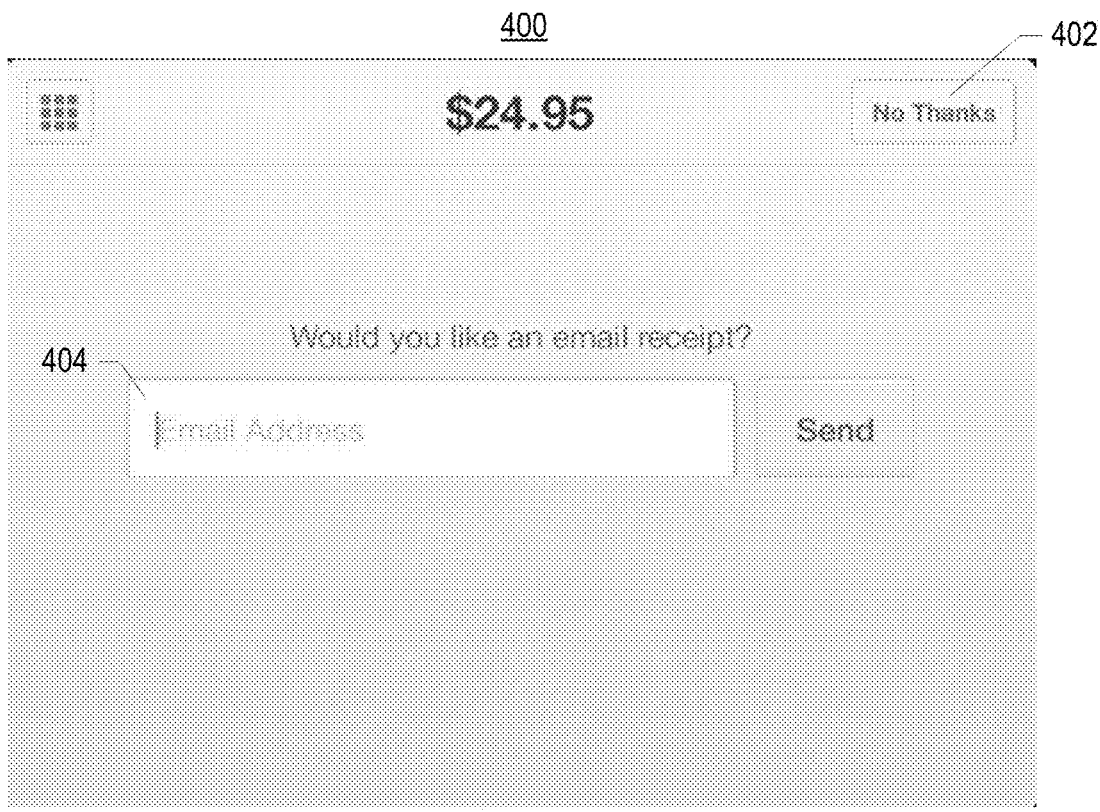

FIG. 4 shows display 400, which is an example of a display that may be presented in response to next button 312 and/or at any other time that it may be desired to prompt the consumer to enter an email address to receive a receipt. In some embodiments, an email address may only be prompted for in display 400 when the merchant device receives an indication that the consumer would like to receive an email receipt (e.g., based on a consumer profile setting, an options (not shown) being previously selected in display 300, etc.). Additionally or alternatively, a consumer's email address may be retrieved from a consumer profile setting (based on, e.g., the consumer's payment information and/or deal offer being redeemed) if the consumer has previously asked to have receipts emailed to the consumer and/or if the consumer has provided an email address to the merchant previously and/or to the system that provided/manages/supports the merchant's point-of-sale functionality. When an email address is presented in display 400, the email address may be at least partially obfuscated. In response to selecting button 402, an email may not be sent to the user. In response to selecting data entry field 404, a display including a virtual keyboard may be provided.

Figure 5:
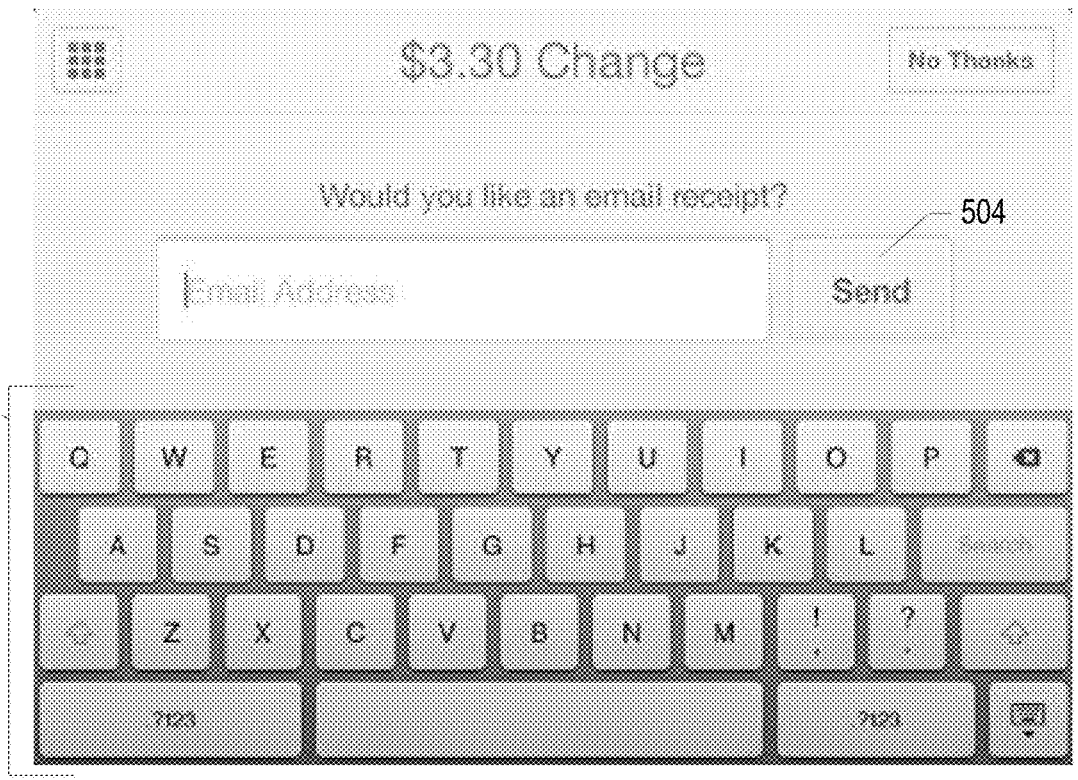
Figure 6:
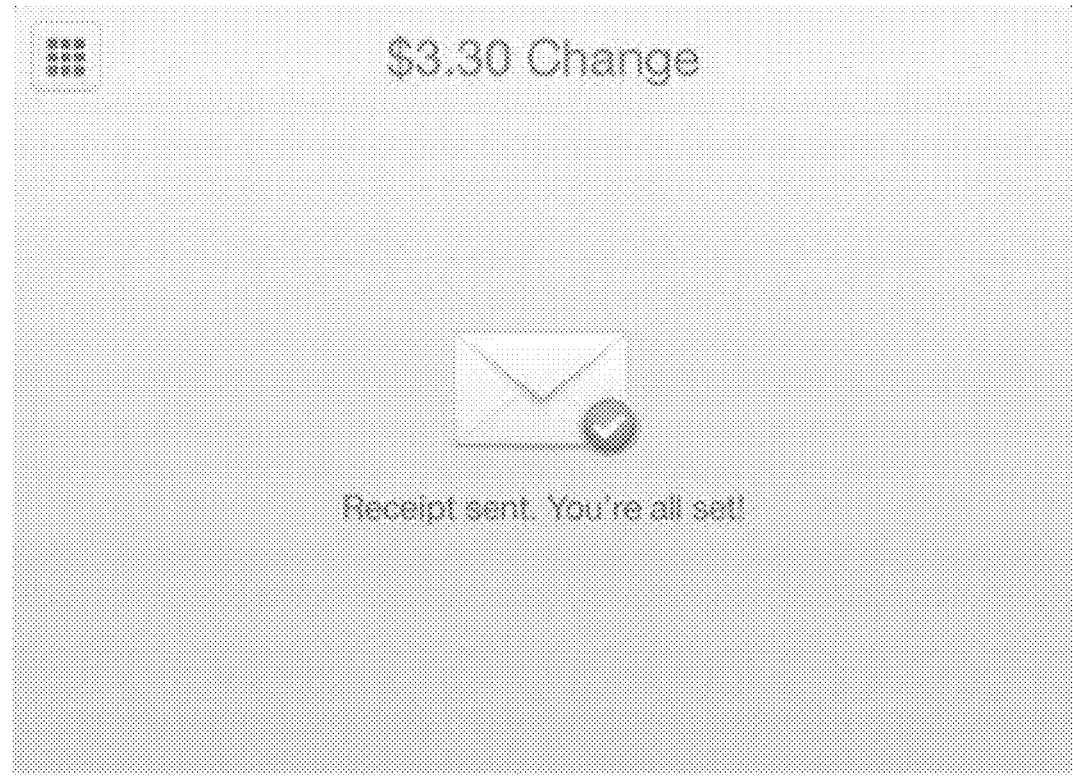

FIG. 5 shows display 500, which includes an example virtual keyboard 502 that can be used to enter an email address to which an electronic receipt can be emailed. In some embodiments, a paper or other type of receipt can be printed as well or instead. Display 500 may also be presented in response to a quick cash button and/or other indication being received that the consumer is owed money from the merchant (such as when the consumer is returning a product, receiving cash back, etc.). In some embodiments, refunds can be provided in response to the merchant looking up a given order and issue full or partial refunds, for cash and/or credit purchases. In response to selecting button 504, an email receipt can be sent to the email address entered using keyboard 502 and display 600 of FIG. 6 can be displayed as a confirmation of the email receipt being sent. In some embodiments, selecting button 504 may also cause the consumer to be automatically enrolled into a promotional system and/or receive an offer to join a promotional system and/or merchant marketing list. In some embodiments, the consumer may be given the option to opt-in and/or opt-out of enrolling with the promotional system and/or the merchant's marketing list by entering its email address and selecting button 504. The email address in combination with merchant-identifying information may also be used to redeem a deal offer that the consumer may have purchased previously in association with an account related to the consumer's email address, wherein the deal offer is also determined to be applicable to the transaction that took place.

While FIGS. 1-6 show example displays optimized for touch-screen terminals, the functionality discussed in connection therewith may be provided a device using any type or types of input components (including, e.g., a mouse, track pad, keyboard, joystick, etc.). Similarly, although not shown herein, a cash drawer and/or other traditional point-of-sale components can be integrated into some embodiments discussed herein and be used for entering orders and closing tabs. The receipt printer, for example, can connect via a network to the point-of-sale machine and a cash drawer can be configured to be slaved to the printer, which can send a command to open the drawer in response to being commanded by the point-of-sale machine.

Further, although not shown herein, reporting functionality may be built into the system. For example, on the merchant device and/or from a remote device that has network access, the merchant and/or other user can view a list of transactions (e.g., after entering verifying information, such as a username and password). Each transaction that takes place at the merchant device can be summarized by date, number and/or amount, among other variables, and the merchant and/or other user can see, for example, the receipt (including line items and refund status). Some embodiments may also be configured to generate a sales report, which can include total sales by day and/or other grouping data (such as, e.g., sales so far the current day). The grouping data may also be by product categories (e.g., entrees, drinks, appetizers, etc.), meal times (breakfast, brunch, lunch, dinner, late night, and/or any other customizable meal time that can be associated with particular hours of particular days), day of week, store area (dining room/bar for a restaurant, or shoes/accessories for a retail outlet, etc.), and/or by customer category (Groupon customers, repeat customers, loyalty customers, Cred Card customers, etc.).

Some embodiments may also provide individual employee tracking (for tip reporting and cash tracking, among other things.) Before FIG. 1 is presented, the merchant may have to log into the system (e.g., by entering an employee identifier code and/or other information, such as a username and password). The merchant device can be configured to differentiate various merchant-types and the roles they perform. For example, an administrator may have different access rights than an employee cashier (e.g., the administrator level access may be required for reporting, changing settings, and applying special discounts). In some embodiments, one or more different types of merchants can be enabled to enter arbitrary discounts (such as a percentage and/or dollar amount off the total amount due).

Figure 7:
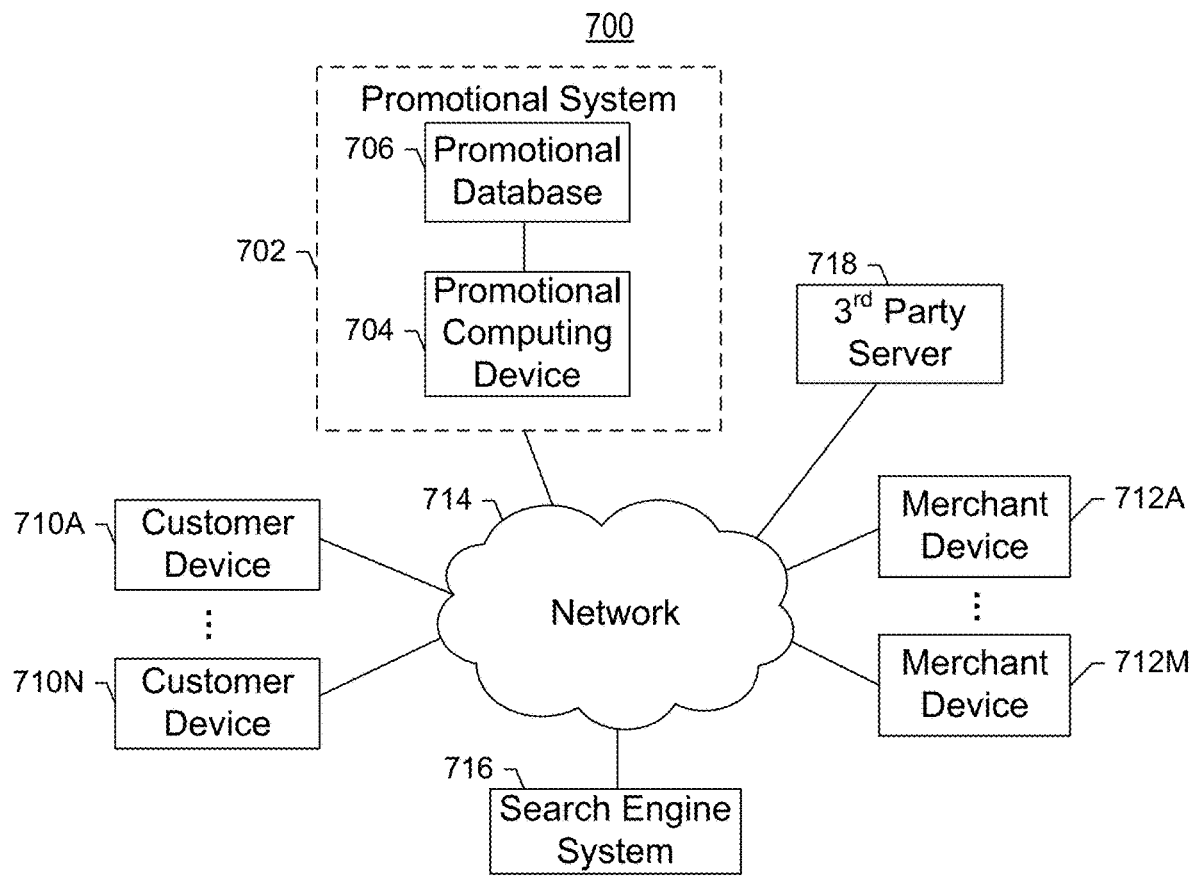
FIG. 7 shows an example system in accordance with some embodiments discussed herein.

FIG. 7 shows system 700 which includes an example network architecture for a system in accordance with some embodiments discussed herein. System 700 may include one or more devices and sub-systems that are configured to implement some embodiments discussed herein. For example, system 700 may include promotional system 702, which can include, for example, promotional computing device 704 and promotional database 706, among other things (not shown). Promotional computing device 704 can be any suitable network server and/or other type of processing device. Promotional database 706 can be any suitable network database configured to store deal parameter data, consumer account information, merchant account information (including point-of-sale configuration setting data that controls how the point-of-sale systems are configured for each merchant) and/or analytics data, such as that discussed herein. In this regard, system 702 may include, for example, at least one backend data server, network database, cloud computing device, among other things.

Promotional system 702 can be coupled to one or more consumer devices 710A-710N and/or one or more merchant devices 712A-712N via network 714. As noted above, the merchant devices 712A-712N can be configured to function as point-of-sale systems. In this regard, network 714 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 714 may include a cellular telephone, an 802.11, 802.16, 802.20, and/or WiMax network. Further, the network 714 may include a public network, such as the Internet, a private network, such as an intranet, or combinations thereof, and may utilize a variety of networking protocols now available or later developed including, but not limited to TCP/IP based networking protocols.

Consumer devices 710A-710N and/or merchant devices 712A-712N may each be implemented as a personal computer and/or other networked device, such as a cellular phone, tablet computer, mobile device, etc., that may be used for any suitable purpose in addition to buying deals and/or offering deals for sale. The depiction in FIG. 7 of "N" consumers and "M" merchants is merely for illustration purposes. System 700 may also include at least one search engine system 716 and/or third party server 718, among other things.

Figure 8:
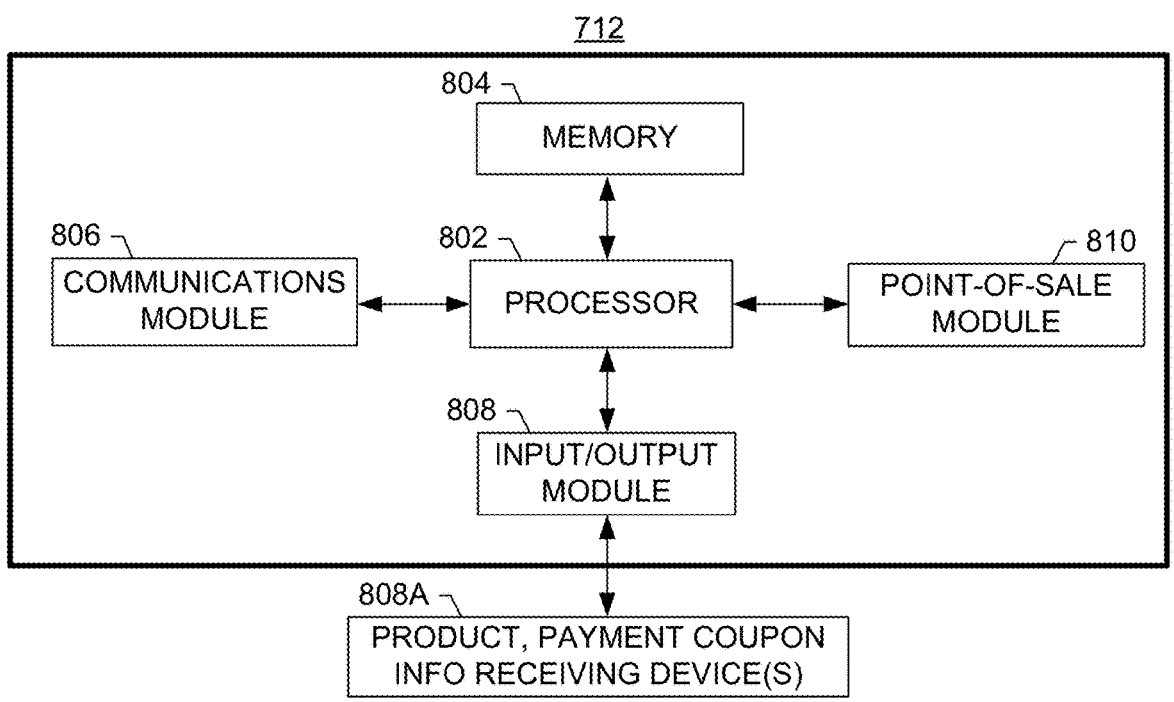
FIG. 8 shows a schematic block diagram of circuitry that can be included in a computing device, such as a point-of-sale machine, in accordance with some embodiments discussed herein.

FIG. 8 shows a schematic block diagram of circuitry, some or all of which may be included in, for example, at least one of merchant devices 712A-712N. As illustrated in FIG. 8, in accordance with some example embodiments, the circuitry can includes various means, such as processor 802, memory 804, communications module 806, input/output module 808 and/or point-of-sale module 810. As referred to herein, "module" includes hardware, software and/or firmware configured to perform one or more particular functions. In this regard, the means of the merchant device's circuitry as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 804) that is executable by a suitably configured processing device (e.g., processor 802), or some combination thereof.

Processor 802 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 8 as a single processor, in some embodiments processor 802 comprises a plurality of processors. The plurality of processors may be embodied on a single computing device or may be distributed across a plurality of computing devices collectively configured to function as merchant device 712. The plurality of processors may be in operative communication with each other and may be collectively configured to perform one or more functionalities of merchant device 712 as described herein. In an example embodiment, processor 802 is configured to execute instructions stored in memory 804 or otherwise accessible to processor 802. These instructions, when executed by processor 802, may cause merchant device 712 to perform one or more of the functionalities of merchant device 712 as described herein.

Whether configured by hardware, firmware/software methods, or by a combination thereof, processor 802 may comprise an entity capable of performing operations according to embodiments of the present invention while configured accordingly. Thus, for example, when processor 802 is embodied as an ASIC, FPGA or the like, processor 802 may comprise specifically configured hardware for conducting one or more operations described herein. Alternatively, as another example, when processor 802 is embodied as an executor of instructions, such as may be stored in memory 804, the instructions may specifically configure processor 802 to perform one or more algorithms and operations described herein, such as those discussed in connection with FIG. 9.

Memory 804 may comprise, for example, volatile memory, non-volatile memory, or some combination thereof. Although illustrated in FIG. 8 as a single memory, memory 804 may comprise a plurality of memory components. The plurality of memory components may be embodied on a single computing device or distributed across a plurality of computing devices. In various embodiments, memory 804 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 804 may be configured to store information, data (including deal parameter data and/or analytics data), applications, instructions, or the like for enabling merchant device 712 to carry out various functions in accordance with example embodiments of the present invention. For example, in at least some embodiments, memory 804 is configured to buffer input data for processing by processor 802. Additionally or alternatively, in at least some embodiments, memory 804 is configured to store program instructions for execution by processor 802. Memory 804 may store information in the form of static and/or dynamic information. This stored information may be stored and/or used by merchant device 712 during the course of performing its functionalities.

Communications module 806 may be embodied as any device or means embodied in circuitry, hardware, a computer program product comprising computer readable program instructions stored on a computer readable medium (e.g., memory 804) and executed by a processing device (e.g., processor 802), or a combination thereof that is configured to receive and/or transmit data from/to another device, such as, for example, promotional system 702, consumer device 714, and/or the like. In some embodiments, communications module 806 (like other components discussed herein) can be at least partially embodied as or otherwise controlled by processor 802. In this regard, communications module 806 may be in communication with processor 802, such as via a bus. Communications module 806 may include, for example, an antenna, a transmitter, a receiver, a transceiver, network interface card and/or supporting hardware and/or firmware/software for enabling communications with another computing device. Communications module 806 may be configured to receive and/or transmit any data that may be stored by memory 804 using any protocol that may be used for communications between computing devices. Communications module 806 may additionally or alternatively be in communication with the memory 804, input/output module 808 and/or any other component of merchant device 712, such as via a bus.

Input/output module 808 may be in communication with processor 802 to receive an indication of a user input and/or to provide an audible, visual, mechanical, or other output to a user (e.g., merchant and/or consumer). Some example visual outputs that may be provided to a user by merchant device 712 are discussed in connection with FIGS. 1-6. As such, input/output module 808 may include support, for example, for a keyboard, a mouse, a joystick, a display, a touch screen display, a microphone, a speaker, a RFID reader, credit card reader, barcode reader, biometric scanner, and/or other input/output mechanisms as represented by 808A. Input/output module 808 may be in communication with the memory 804, communications module 806, and/or any other component(s), such as via a bus. Although more than one input/output module and/or other component can be included in merchant device 712, only one is shown in FIG. 8 to avoid overcomplicating the drawing (like the other components discussed herein).

Point-of-sale module 810 may also or instead be included and configured to perform the functionality discussed herein related to merchant device's the point-of-sale functionality discussed herein. In some embodiments, some or all of the point-of-sale functionality may be performed by processor 802. In this regard, the example processes and algorithms discussed herein can be performed by at least one processor 802 and/or point-of-sale module 810. For example, non-transitory computer readable media can be configured to store firmware, one or more application programs, and/or other software, which include instructions and other computer-readable program code portions that can be executed to control each processor (e.g., processor 802 and/or point-of-sale module 810) of the components of system 712 to implement various operations, including the examples shown above. As such, a series of computer-readable program code portions are embodied in one or more computer program products and can be used, with a computing device, server, and/or other programmable apparatus, to produce machine-implemented processes.

Figure 9:
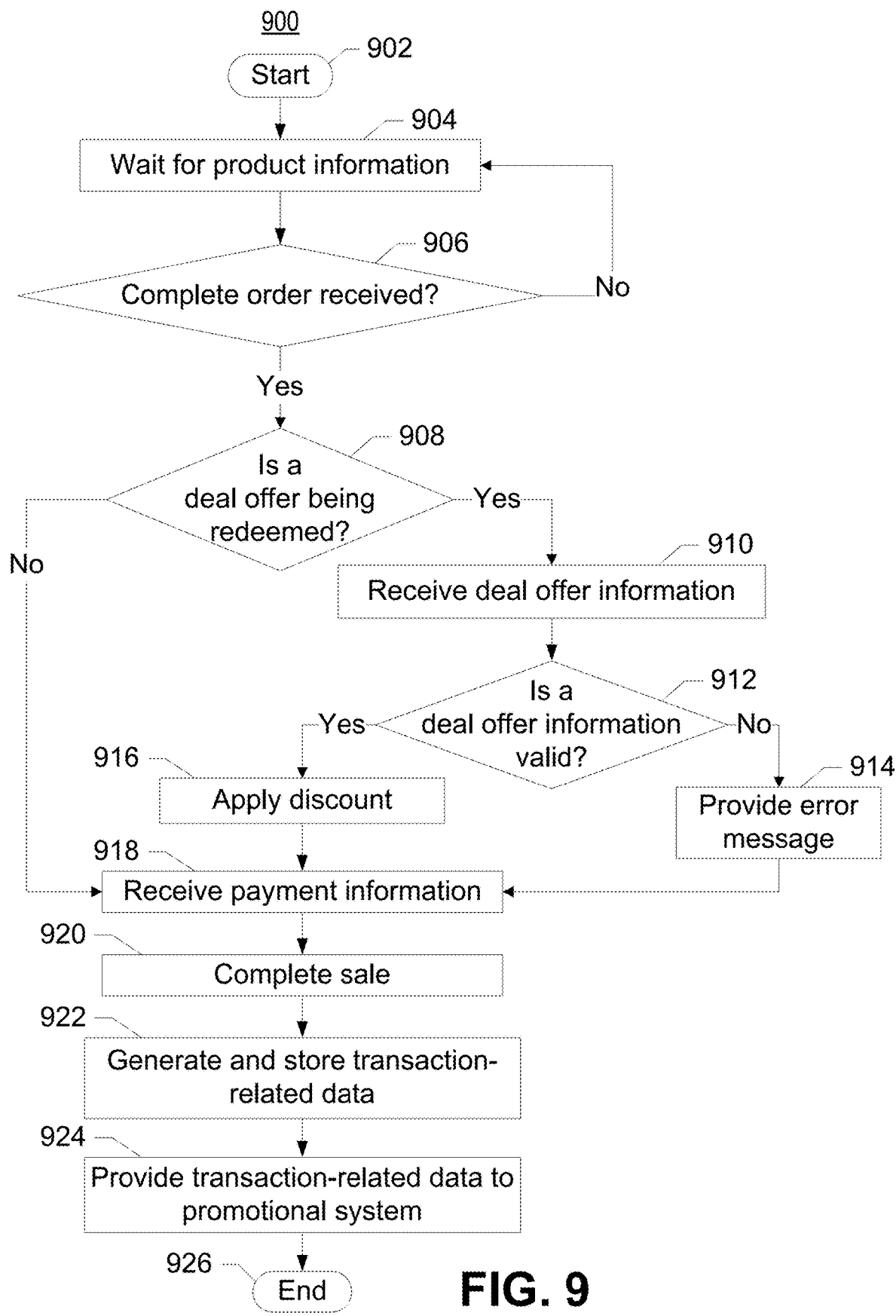
FIG. 9 shows a flow chart showing an exemplary process of facilitating a merchant transaction that includes collecting and providing transaction data to a remote device in accordance with some embodiments discussed herein.

FIG. 9 shows an example method, namely process 900, that may be executed by one or more machines (some examples of which are discussed in connection with FIGS. 7 and 8) to provide the displays of FIGS. 1-6, among others, in accordance with some embodiments discussed herein. Process 900 starts at 902 and waits for product information to be received at 904. For example, process 900 may wait for a merchant, such as a cashier-level user, to login to the point-of-sale machine and make one or more selections of products (by, e.g., touching items presented in display 100).

At 906, a determination can be made as to whether or not the consumer's order has been fully received by the point-of-sale machine. For example, a determination can be made that more product information is to be received until checkout button 112 of FIG. 1 is selected.

In response to determining that the complete order has been received, a determination can be made at 908 as to whether a deal offer is being redeemed at 908. For example, a deal offer may be presented or otherwise received (e.g., automatically through a network and/or the consumer providing identifying data, such as an email address or credit card) that was purchased or otherwise obtained by the consumer. For example, the consumer may present a merchant-generated coupon (e.g., a loyalty card that gives a free coffee after 10 coffees have been purchased), a coupon clipped from a newspaper, a discount offer received via email, a deal offer purchased from a promotional system (such as Groupon, Inc. of Chicago, Ill.) and/or any other type of deal offer.

In response to determining a deal offer is being presented at 908 for redemption, the system can receive the deal offer information at 910. For example, the merchant can scan a code (e.g., barcode) using a camera included in the merchant device and/or manually enter a code into the point-of-sale system. A determination can be made at 912 as to whether or not the deal offer information is valid. For example, how the order was created, whether the deal was completed within a predetermined time window (e.g., certain day, certain day of the week and/or certain time window during a day), whether certain products were included in the transaction, and/or whether the order was over a certain dollar threshold, among other things, may be factored when determining whether the deal is valid. In response to determining the deal offer is not valid (e.g., has already been redeemed, is not known to the promotional system that manages the deal offers, etc.), an error message can be provided at 914. In response to determining the deal offer is valid, the discount can be applied to the consumer's purchase at 916.

In addition to determining whether a deal offer is valid, the merchant device can be configured to log and/or alert the merchant and/or remote device of other errors. For example, when a credit card is not properly read after being swiped, a temporary overlay indicating the faulty swipe can be displayed, and suggest that the merchant should try again. As another example, when a credit card is declined, a modal can be displayed indicating that the card was declined with options to accept the decline message and/or retry sending the data. In some embodiments, unless the card is charged successfully, the merchant may be redirected to the order or tender display discussed above. Process 900 may also be running a timer in the background and be configured to present a timeout or system error message indicating the nature of the error with accept and/or retry options. When a network error is detected (and/or any other operation) fails due to Internet connection not being available, an appropriately-crafted error message can be provided to the merchant.

Additionally or alternatively, color-coded indications can be used to indicate the status of various hardware components. For example, a green credit card swiper indication can indicate the credit card swiper peripheral is connected and functioning properly, a red credit card swiper indication can indicate the credit card swiper peripheral is connected properly but failing to function properly, and a gray credit card swiper indication can indicate the credit card swiper peripheral is not connected property (and a display can be provided suggesting that the merchant remove and reattach if necessary).

At 918, payment can be received from the consumer. Examples of how payment can be received at 918 are discussed in connection with, e.g., FIGS. 2 and 3. At 920, the sale of the product can be completed (e.g., the consumer's payment information can be verified, money can be transferred to the merchant and/or the merchant can transfer the product and/or receipt to the consumer).

At 922, the point-of-sale system can be configured to generate and store transaction-related data. For example, the time of day, payment type, consumer information (e.g., email address, loyalty program account number, name, etc.), deal offer information, merchant login credentials, amount of money received, tax rate applied, quantity of product sold, deal overspend, and/or any other information related to the transaction. At 924, the data generated, compiled and/or stored throughout process 900 can be transmitted to a remote system, such as promotional system 702. Process 900 then ends at 926.

Promotional system 702 can be configured to remotely access the merchant device (such as its point-of-sale module) via an account the merchant has configured with the promotional system. Upon accessing the merchant device, the promotional system can configure menu items for the merchant, generate analytics data for the merchant, review order histories, manage a dynamic promotional campaign, provide a suggestion for a deal offer, run an tax accounting program, conduct a loss prevention/loss detection audit of various employees and/or locations, run reports, and/or otherwise provide any useful service to the merchant based on the information received from the point-of-sale system and/or other sources. Additionally or alternatively, promotional system 702 can enable a merchant to access point-of-sale information while remote from a point-of-sale machine using any suitably networked device.

Figure 10:
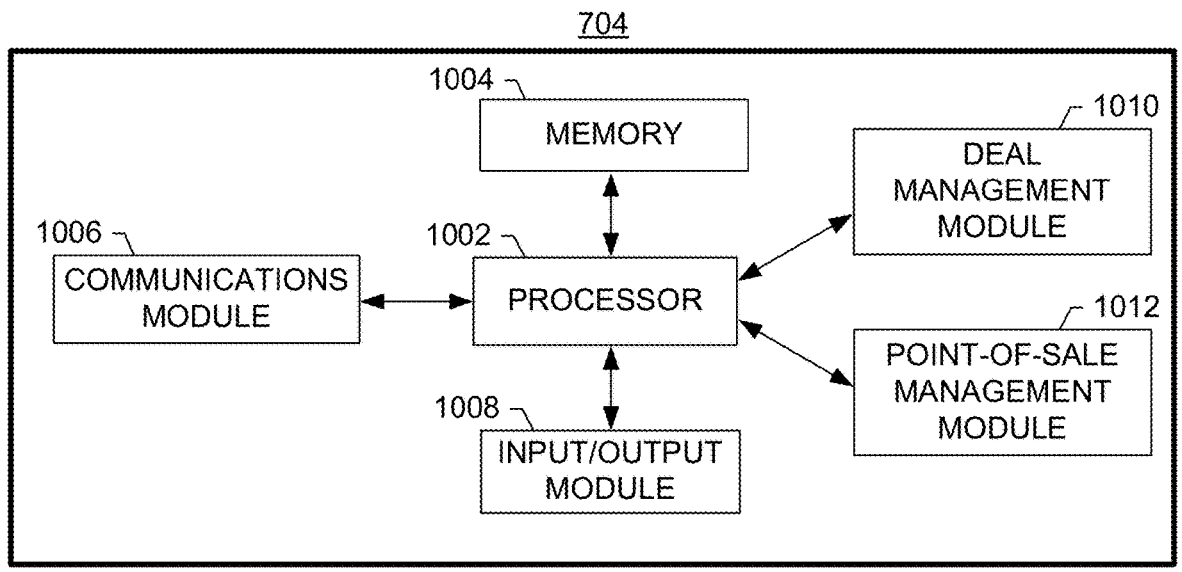
FIG. 10 shows a schematic block diagram of circuitry that can be included in a computing device, such as a promotional computing device, in accordance with some embodiments discussed herein.

FIG. 10 shows a block diagram of example circuitry that may be included in promotional computing device 704, which may be configured to perform the analysis, management and/or other functionality discussed in connection with promotion system 702. In this manner, from the merchant's perspective, promotional computing device 704 may provide cloud computing functionality and services to the merchant. As illustrated in FIG. 10 and in accordance with some example embodiments, promotional computing device 704 can includes various means, such as processor 1002, memory 1004, communications module 1006, input/output module 1008, deal management module 1010 and/or point-of-sale management module 1012.

Processor 1002 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 10 as a single processor, in some embodiments, processor 1002 comprises a plurality of processors. The plurality of processors may be embodied on a single computing device or may be distributed across a plurality of computing devices collectively configured to function as circuitry 1000. The plurality of processors may be in operative communication with each other and may be collectively configured to perform one or more functionalities of circuitry 1000 as described herein. In an example embodiment, processor 1002 is configured to execute instructions stored in memory 1004 or otherwise accessible to processor 1002. These instructions, when executed by processor 1002, may cause circuitry 1000 to perform one or more of the functionalities of circuitry 1000 as described herein.

Whether configured by hardware, firmware/software methods, or by a combination thereof, processor 1002 may comprise an entity capable of performing operations according to embodiments of the present invention while configured accordingly. Thus, for example, when processor 1002 is embodied as an ASIC, FPGA or the like, processor 1002 may comprise specifically configured hardware for conducting one or more operations described herein. Alternatively, as another example, when processor 1002 is embodied as an executor of instructions, such as may be stored in memory 1004, the instructions may specifically configure processor 1002 to perform one or more algorithms and operations described herein, such as that discussed in connection with FIG. 11.

Memory 1004 may comprise, for example, volatile memory, non-volatile memory, or some combination thereof. Although illustrated in FIG. 10 as a single memory, memory 1004 may comprise a plurality of memory components. The plurality of memory components may be embodied on a single computing device or distributed across a plurality of computing devices. In various embodiments, memory 1004 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 1004 may be configured to store information, data (including deal parameter data and/or analytics data), applications, instructions, or the like for enabling circuitry 1000 to carry out various functions in accordance with example embodiments of the present invention. For example, in at least some embodiments, memory 1004 is configured to buffer input data for processing by processor 1002. Additionally or alternatively, in at least some embodiments, memory 1004 is configured to store program instructions for execution by processor 1002. Memory 1004 may store information in the form of static and/or dynamic information. This stored information may be stored and/or used by circuitry 1000 during the course of performing its functionalities.

Communications module 1006 may be embodied as any device or means embodied in circuitry, hardware, a computer program product comprising computer readable program instructions stored on a computer readable medium (e.g., memory 1004) and executed by a processing device (e.g., processor 1002), or a combination thereof that is configured to receive and/or transmit data from/to another device, such as, for example, merchant device 712, consumer device 714 and/or the like. In some embodiments, communications module 1006 (like other components discussed herein) can be at least partially embodied as or otherwise controlled by processor 1002. In this regard, communications module 1006 may be in communication with processor 1002, such as via a bus. Communications module 1006 may include, for example, an antenna, a transmitter, a receiver, a transceiver, network interface card and/or supporting hardware and/or firmware/software for enabling communications with another computing device. Communications module 1006 may be configured to receive and/or transmit any data that may be stored by memory 1004 using any protocol that may be used for communications between computing devices. Communications module 1006 may additionally or alternatively be in communication with the memory 1004, input/output module 1008 and/or any other component of circuitry 1000, such as via a bus.

Input/output module 1008 may be in communication with processor 1002 to receive an indication of a user input and/or to provide an audible, visual, mechanical, or other output to a user (e.g., a promotional system administrator and/or cloud computer programmer). As such, input/output module 1008 may include support, for example, for a keyboard, a mouse, a joystick, a display, a touch screen display, a microphone, a speaker, a RFID reader, barcode reader, biometric scanner, and/or other input/output mechanisms. In embodiments wherein promotional computing device 704 is embodied as a server, aspects of input/output module 1008 may be reduced as compared to embodiments where the promotional computing device 704 is implemented as an end-user machine (e.g., consumer device and/or merchant device) or other type of device designed for complex user interactions. In some embodiments (like other components discussed herein), input/output module 1008 may even be eliminated from promotional computing device 704. Input/output module 1008 may be in communication with the memory 1004, communications module 1006, and/or any other component(s), such as via a bus. Although more than one input/output module and/or other component can be included in promotional computing device 704, only one is shown in FIG. 10 to avoid overcomplicating the drawing (like the other components discussed herein).

Deal management module 1010 may also be included and configured to perform the functionality discussed herein related to generating, managing, redeeming and/or editing deal offers. In some embodiments, some or all of the functionality of generating and/or editing deal offers may be performed by processor 1002. In this regard, the example processes and algorithms discussed herein can be performed by at least one processor 1002 and/or deal management module 1010. For example, non-transitory computer readable media can be configured to store firmware, one or more application programs, and/or other software, which include instructions and other computer-readable program code portions that can be executed to control each processor (e.g., processor 1002 and/or deal management module 1010) of the components of promotional computing device 704 to implement various operations, including the examples shown above. As such, a series of computer-readable program code portions are embodied in one or more computer program products and can be used, with a computing device, server, and/or other programmable apparatus, to produce machine-implemented processes.

For example, deal management module 1010 can be configured to analyze multiple potential deal offers (e.g., including various combinations of days, times, products, durations, etc.) in view of known past product sales (based on information received from the merchant device), expected product arrivals, merchant needs (such as, e.g., needing to sell excess inventory, underutilized service appointments, and/or inventory about to expire). As a result of this analysis, deal management module 1010 can be configured to recommend one (or a list) of potential deal offers to present to a merchant device.

Point-of-sale management module 1012 can be configured to enable promotional computing device to remotely access and/or configure one or more merchant devices. For example, point-of-sale management module 1012 can be the component of promotional computing device 704 that is configured to enable reception of transaction data from a merchant device, configuration of menu items provided by the merchant device, generation of analytics data for the merchant, reviewing of order histories, providing tax accounting services based on transaction information, conducting a loss prevention/loss detection audit of various employees and/or locations based on transaction information received from the point-of-sale device, and/or otherwise provide any useful service to the merchant based on the information received from the point-of-sale system and/or other sources. Although point-of-sale management module 1012 is shown as being a single module included in single promotional computing device, both the promotional computing device and/or point-of-sale management module 1012 (like other devices and components discussed herein) can be embodied as a plurality of distributed systems, apparatuses, and/or any other suitable machine(s).

Figure 11:
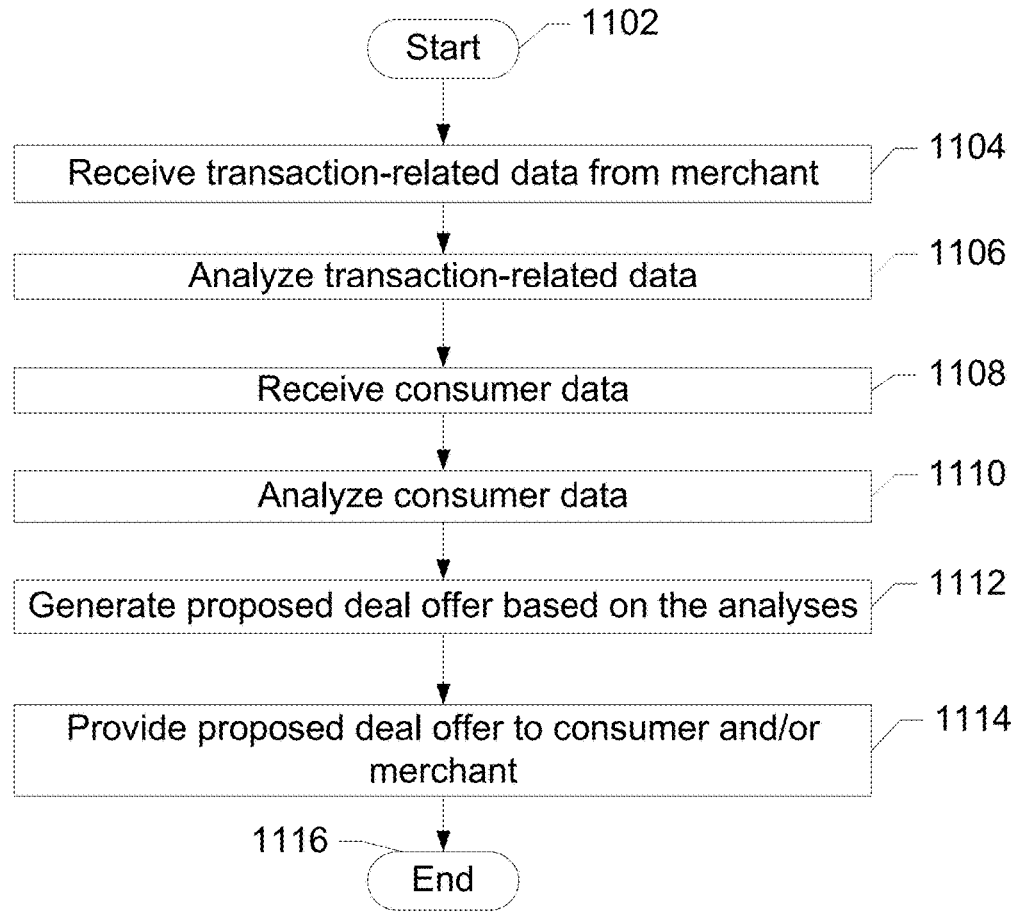
FIG. 11 shows a flow chart showing an exemplary process of analyzing transaction and consumer data to provide services in accordance with some embodiments discussed herein.

FIG. 11 shows an example method, namely process 1100, that may be executed by one or more machines (some examples of which are discussed in connection with FIGS. 7 and 10), among others, in accordance with some embodiments discussed herein. For example, processor 1002, deal management module 1010 and/or point-of-sale management module 1012 can be configured to perform the processing functionality required to provide process 1100. Process 1100 starts at 1102.

At 1104, the promotional computing device can be configured to receive transaction-related data from the merchant device (such as that transmitted at 924 of process 900 discussed above). At 1106, this information can be analyzed, which may include the promotional computing device determining, for example, which products are selling, how products are selling, when products are selling, when deals are being used, overspend amounts when deals are used, and/or any other information that may be used by the promotional computing device to provide a service to one or more merchants and/or consumers. For example, the promotional device may be configured to generate a deal offer based transaction related data provided by the merchant's point-of-sale machine(s). The deal offer may be for the merchant and/or for other merchants (e.g., those in other geographic areas and/or the same geographic area). Other merchants may also include similarly situated merchants, such as merchants in the same or related industry, geographic area, target demographic, price range, etc.

In some embodiments, what information is received, how the information is used and/or other parameters related to the information generated by the merchant's point-of-sale machine may be governed by an agreement between the merchant and the promotional computing device. The agreement and its terms may also be maintained and used as a basis in configuring the functionality of the promotional system when interacting with each merchant device. For example, the merchant may be able to avoid some or all fees associated with the services provided by the promotional system that are used to support the point-of-sale functionality discussed herein in exchange for allowing the promotional system to analyze some or all of the information that is obtained and/or otherwise derived from the point-of-sale functionality of one or more merchant devices (e.g., a discount for sharing transaction data with the promotional system for the benefit of other merchants).

At 1108, consumer data may be received by the promotional computing device. The consumer data may originate from, for example, one or more merchant devices, one or more consumer devices, and/or any other device. In this regard, the consumers may provide consumer data to the promotional system (e.g., may create an account and provide payment information in exchange for receiving one or more deal offers, marketing materials and/or other services provided by the promotional system). The consumer data may be analyzed at 1110, including the consumer's purchasing history, deal-use history, location history, etc. In some embodiments, how the information received from the consumer may be governed by an agreement between the consumer and the promotional computing device, which may also be maintained and referenced by the promotional system.

At 1112, the promotional computing device can be configured to generate one or more proposed deal offers based on the analyses, and provide the proposed deal offers to the merchant and/or consumer (e.g., to a merchant device and/or consumer device) at 1114. In some embodiments, a proposed deal offer may be in the form of one or more impressions. An "impression," as used herein, refers to a communication, a display, or other perceived indication, such as a flyer, print media, e-mail, text message, application alert, mobile applications, other type of electronic interface or distribution channel and/or the like, of one or more promotions or deal offers. For example, an e-mail communication may be sent to consumers that indicates the availability of a $25 for $50 toward running shoes promotion.

In some embodiments, the promotional computing device may be configured to optimize deal offers based on transaction-related data. For example, when the transaction-related data may indicate merchant activity level (e.g., sale level, reservations, or other indicators). When merchant activity level is determined to be slow, a deal offer may be generated and/or optimized to increase the merchant activity level. For example, a deal offer may be generated when sales are slow, when a reservation book is low, to promote higher margin items, etc. In some embodiments, the merchant may be allowed to create a deal offer on demand that is optimized based on transaction-related data. Details regarding programmatically generating deal offer parameters that may be triggered and/or modified by a merchant, applicable in some embodiments, are discussed in greater detail in U.S. Provisional Patent Application No. 61/618,338, entitled "GENERATING DEAL OFFERS AND PROVIDING ANALYTICS DATA," which is incorporated by reference in its entirety herein.

In addition to or instead of creating deal offers, any other suitable service can be provided by the promotional computing device. In some embodiments, the promotional computing device may be configured to use the consumer data to determine a return on investment of the one or more deal offers. For example, the benefit of a deal offer to the merchant (e.g., in the form of increased revenues, consumer visitation and repeat business attendant to administering a deal, etc.) may be compared with the cost of providing the deal offer. Furthermore, relative return on investment between different deal offers or deal structures (e.g., $20 deal voucher for $40 value at the merchant) may be compared. Such information may then be used to generate deal offers and/or impressions that may be expected to produce positive returns and/or the most positive returns. Additional details regarding techniques for determining return on investment of deal offers, applicable to some embodiments, is discussed in U.S. Provisional Patent Application No. 61/682,762, titled "UNIFIED PAYMENT AND RETURN ON INVESTMENT SYSTEM," which is hereby incorporated by reference in its entirety.

In some embodiments, the promotional computing device may be configured to facilitate seamless redemption of provided deal offers. Details regarding redemption of deal offers are discussed in greater detail in U.S. Provisional Patent Application No. 61/661,291, titled "FACILITATING CONSUMER PAYMENTS AND REDEMPTIONS OF DEAL OFFERS," which is hereby incorporated by reference in its entirety. Process 1100 may end at 1116.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for generating a transactional incentive campaign, the computer-implemented method comprising:
   remotely configuring, via a promotional system, a plurality of merchant devices to function as point-of-sale devices, wherein each of the plurality of merchant devices is associated with a respective merchant entity of a plurality of merchant entities;
   obtaining transactional data from the plurality of merchant devices based on an authorization by each merchant entity of the plurality of merchant entities, wherein at least a portion of the transactional data is generated by the merchant devices in association with one or more product purchase transactions conducted by the respective merchant entity;
   generating, based on the transactional data, one or more cross-entity transactional correlations, wherein each cross-entity transactional correlation of the one or more cross-entity transactional correlations indicates that a first transactional pattern associated with one or more first merchant entities of the plurality of merchant entities is temporally correlated with a second transactional pattern associated with one or more second merchant entities of the plurality of merchant entities;
   determining, based on the transactional data, a low activity time prediction for the one or more second merchant entities, wherein determining the low activity time prediction for the one or more second merchant entities comprises determining a low activity time prediction for a selected product type for the one or more second merchant entities; and
   generating the transactional incentive campaign based on the one or more cross-entity transactional correlations and the low activity time prediction,
   wherein generating the transactional incentive campaign comprises generating one or more deal offers on behalf of the one or more second merchant entities, and wherein each of the one or more deal offers is redeemable during the low activity time prediction.

2. The computer-implemented method of claim 1, wherein determining the low activity time prediction for the one or more second merchant entities comprises:

determining, based on the transactional data and for each second merchant entity of the one or more second merchant entities, a first time of day during which the respective second merchant entity has, in the past, been associated with fewer transactions associated with the selected product type relative to other times of day.

3. The computer-implemented method of claim 1, wherein the plurality of merchant entities are associated with a first merchant location.

4. The computer-implemented method of claim 1, wherein the plurality of merchant entities comprises at least a first merchant entity group associated with a first merchant location and a second merchant entity group associated with a second merchant location.

5. The computer-implemented method of claim 1, wherein generating the transactional incentive campaign based on the one or more cross-entity transactional correlations and the low activity time prediction further comprises generating one or more deal offers for each of the one or more first merchant entities, wherein each of the one or more deal offers for each of the one or more first merchant entities is redeemable during the low activity time prediction.

6. The computer-implemented method of claim 1, wherein the transactional data comprises one or more of a sales purchase history, consumer information, product price, profitability data, quantity, timestamp, cashier information, and merchant identifying information.

7. The computer-implemented method of claim 1, wherein the selected product type comprises a high value product.

8. The computer-implemented method of claim 7, wherein generating one or more deal offers on behalf of the one or more second merchant entities comprises generating a product-restricted deal offer for the high value product.

9. The computer-implemented method of claim 7, wherein generating one or more deal offers on behalf of the one or more second merchant entities comprises generating a product-restricted deal offer for a complementary product to the high value product.

10. An apparatus comprising at least one processor and at least one non-transitory memory comprising program code, wherein the at least one non-transitory memory and the program code are configured to, with the at least one processor, cause the apparatus to:
remotely configure, via a promotional system, a plurality of merchant devices to function as point-of-sale devices, wherein each of the plurality of merchant devices is associated with a respective merchant entity of a plurality of merchant entities;
obtain transactional data from the plurality of merchant devices based on an authorization by each merchant entity of the plurality of merchant entities, wherein at least a portion of the transactional data is generated by the merchant devices in association with one or more product purchase transactions conducted by the respective merchant entity;
generate, based on the transactional data, one or more cross-entity transactional correlations, wherein each cross-entity transactional correlation of the one or more cross-entity transactional correlations indicates that a first transactional pattern associated with one or more first merchant entities of the plurality of merchant entities is temporally correlated with a second transactional pattern associated with one or more second merchant entities of the plurality of merchant entities;

determine, based on the transactional data, a low activity time prediction for the one or more second merchant entities, wherein determining the low activity time prediction for the one or more second merchant entities comprises determining a low activity time prediction for a selected product type for the one or more second merchant entities; and
generate a transactional incentive campaign based on the one or more cross-entity transactional correlations and the low activity time prediction, wherein generating the transactional incentive campaign comprises generating one or more deal offers on behalf of the one or more second merchant entities, and wherein each of the one or more deal offers is redeemable during the low activity time prediction.

11. The apparatus of claim 10, wherein determining the low activity time prediction for the one or more second merchant entities comprises:
determining, based on the transactional data and for each second merchant entity of the one or more second merchant entities, a first time of day during which the respective second merchant entity has in the past been associated with fewer transactions associated with the selected product type relative to other times of day.

12. The apparatus of claim 10, wherein the plurality of merchant entities are associated with a first merchant location.

13. The apparatus of claim 10, wherein the plurality of merchant entities comprises at least a first merchant entity group associated with a first merchant location and a second merchant entity group associated with a second merchant location.

14. The apparatus of claim 10, wherein generating the transactional incentive campaign based on the one or more cross-entity transactional correlations and the low activity time prediction further comprises generating one or more deal offers for each of the one or more first merchant entities, wherein each of the one or more deal offers for each of the one or more first merchant entities is redeemable during the low activity time prediction.

15. The apparatus of claim 10, wherein the selected product type comprises a high value product and wherein generating one or more deal offers on behalf of the one or more second merchant entities comprises generating a product-restricted deal offer for the high value product, generating a product-restricted deal offer for a complementary product to the high value product, or a combination thereof.

16. A computer program product comprising a non-transitory computer readable storage medium and computer program instructions stored therein, the computer program instructions comprising program instructions configured to:
remotely configure, via a promotional system, a plurality of merchant devices to function as point-of-sale devices, wherein each of the plurality of merchant devices is associated with a respective merchant entity of a plurality of merchant entities;
obtain transactional data from the plurality of merchant devices based on an authorization by each merchant entity of the plurality of merchant entities, wherein at least a portion of the transactional data is generated by the merchant devices in association with one or more product purchase transactions conducted by the respective merchant entity;
generate, based on the transactional data, one or more cross-entity transactional correlations, wherein each cross-entity transactional correlation of the one or more cross-entity transactional correlations indicates that a first transactional pattern associated with one or more first merchant entities of the plurality of merchant entities is temporally correlated with a second transactional pattern associated with one or more second merchant entities of the plurality of merchant entities;
determine, based on the transactional data, a low activity time prediction for the one or more second merchant entities, wherein determining the low activity time prediction for the one or more second merchant entities comprises determining a low activity time prediction for a selected product type for the one or more second merchant entities; and
generate a transactional incentive campaign based on the one or more cross-entity transactional correlations and the low activity time prediction, wherein generating the transactional incentive campaign comprises generating one or more deal offers on behalf of the one or more second merchant entities, and wherein each of the one or more deal offers is redeemable during the low activity time prediction.

17. The computer program product of claim 16, wherein determining the low activity time prediction for the one or more second merchant entities comprises:

determining, based on the transactional data and for each second merchant entity of the one or more second merchant entities, a first time of day during which the respective second merchant entity has, in the past, been associated with fewer transactions associated with the selected product type relative to other times of day.

18. The computer program product of claim 16, wherein the selected product type comprises a high value product and wherein generating one or more deal offers on behalf of the one or more second merchant entities comprises generating a product-restricted deal offer for the high value product, generating a product-restricted deal offer for a complementary product to the high value product, or a combination thereof.

* * * * *

UNITED STATES PATENT AND TRADEMARK OFFICE
CERTIFICATE OF CORRECTION

| | |
|---|---|
| PATENT NO. | : 11,386,461 B2 |
| APPLICATION NO. | : 16/380526 |
| DATED | : July 12, 2022 |
| INVENTOR(S) | : Nathaniel B. Scholl et al. |

It is certified that error appears in the above-identified patent and that said Letters Patent is hereby corrected as shown below:

On the Title Page

Item (63), Related U.S. Application Data:
"application No. 13/839,266, filed on Mar. 15, 2013"
Should read:
--application No. 13/839,226, filed on Mar. 15, 2013--

Signed and Sealed this
Thirty-first Day of January, 2023

Katherine Kelly Vidal
*Director of the United States Patent and Trademark Office*